United States Patent
Choi et al.

(10) Patent No.: US 12,456,751 B2
(45) Date of Patent: Oct. 28, 2025

(54) SOLID ION CONDUCTOR COMPOUND, SOLID ELECTROLYTE COMPRISING THE SAME, ELECTROCHEMICAL CELL COMPRISING THE SAME, AND METHOD OF PREPARING THE SAME

(71) Applicant: Samsung Electronics Co., Ltd., Suwon-si (KR)

(72) Inventors: Wonsung Choi, Hwaseong-si (KR); Gabin Yoon, Seoul (KR); Jusik Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 60 days.

(21) Appl. No.: 17/509,537

(22) Filed: Oct. 25, 2021

(65) Prior Publication Data

US 2022/0149430 A1    May 12, 2022

(30) Foreign Application Priority Data

Nov. 12, 2020  (KR) .......................... 10-2020-0151113

(51) Int. Cl.
| | |
|---|---|
| *H01M 10/0562* | (2010.01) |
| *H01M 4/36* | (2006.01) |
| *H01M 4/40* | (2006.01) |
| *H01M 10/0525* | (2010.01) |
| *H01M 4/02* | (2006.01) |

(52) U.S. Cl.
CPC ....... *H01M 10/0562* (2013.01); *H01M 4/366* (2013.01); *H01M 4/405* (2013.01); *H01M 10/0525* (2013.01); *H01M 2004/021* (2013.01); *H01M 2300/008* (2013.01)

(58) Field of Classification Search
CPC .. H01M 10/0562; H01M 4/366; H01M 4/405; H01M 10/0525; H01M 2004/021; H01M 2300/008
See application file for complete search history.

(56) References Cited

U.S. PATENT DOCUMENTS

| | | |
|---|---|---|
| 6,402,795 B1 | 6/2002 | Chu et al. |
| 6,485,622 B1 | 11/2002 | Fu |

(Continued)

FOREIGN PATENT DOCUMENTS

| | | |
|---|---|---|
| CN | 109775744 A | 5/2019 |
| CN | 109950617 A | 6/2019 |

(Continued)

OTHER PUBLICATIONS

Nagamine et al. (WO2020/137026 and using Machine Translation as English version) (Year: 2020).*

(Continued)

*Primary Examiner* — Milton I Cano
*Assistant Examiner* — Joshua P McClure
(74) *Attorney, Agent, or Firm* — CANTOR COLBURN LLP

(57) ABSTRACT

A solid ion conductor compound represented by Formula 1:

$$Li_xM1_aM2_bCl_yBr_z \quad \text{Formula 1}$$

wherein M1 is an alkali metal, an alkaline earth metal, a transition metal, or a combination thereof, M2 is a lanthanide element, or a combination thereof, $0<x<3.5$, $0\le a<1.5$, $0<b<1.5$, $0<y<6$, $0<z<6$, and $0.166<y/z\le 5$.

17 Claims, 10 Drawing Sheets

(56) References Cited

U.S. PATENT DOCUMENTS

| | | | |
|---|---|---|---|
| 7,901,658 | B2 | 3/2011 | Weppner et al. |
| 8,828,580 | B2 | 9/2014 | Visco et al. |
| 2015/0044575 | A1 | 2/2015 | Kawaji et al. |
| 2018/0006326 | A1 | 1/2018 | O'Neill et al. |
| 2018/0269526 | A1 | 9/2018 | Takeuchi et al. |
| 2019/0088995 | A1 | 3/2019 | Asano et al. |
| 2020/0075993 | A1 | 3/2020 | Ling et al. |
| 2020/0212478 | A1 | 7/2020 | Sakai et al. |
| 2020/0212481 | A1 | 7/2020 | Nagamine et al. |
| 2020/0328455 | A1* | 10/2020 | Sakai ............... H01M 4/62 |
| 2020/0328459 | A1 | 10/2020 | Sakai et al. |
| 2020/0328468 | A1 | 10/2020 | Sakaida et al. |
| 2020/0335817 | A1 | 10/2020 | Asano et al. |
| 2021/0098824 | A1 | 4/2021 | Nishio et al. |
| 2021/0098825 | A1 | 4/2021 | Sakaida et al. |
| 2021/0126284 | A1 | 4/2021 | Sakaida et al. |
| 2022/0006116 | A1 | 1/2022 | Choi et al. |
| 2022/0149426 | A1 | 5/2022 | Yoon et al. |
| 2022/0149430 | A1 | 5/2022 | Choi et al. |
| 2022/0216507 | A1* | 7/2022 | Sun ............... C03C 10/16 |
| 2022/0223904 | A1 | 7/2022 | Choi et al. |
| 2022/0255125 | A1* | 8/2022 | Suzuki ............... H01B 1/06 |

FOREIGN PATENT DOCUMENTS

| | | | | |
|---|---|---|---|---|
| CN | 110137561 | A | * 8/2019 | ........ H01M 10/0525 |
| CN | 111146425 | A | 5/2020 | |
| CN | 111640979 | A | 9/2020 | |
| EP | 3736897 | A1 | 11/2020 | |
| EP | 3863025 | A1 | 8/2021 | |
| EP | 3905273 | A1 | 11/2021 | |
| EP | 3905277 | A1 | 11/2021 | |
| JP | 2006244734 | A | 9/2006 | |
| KR | 101602416 | A | 3/2016 | |
| KR | 20190001798 | A | 1/2019 | |
| KR | 20200069215 | A | 6/2020 | |
| WO | 2015079509 | A1 | 6/2015 | |
| WO | 2019004714 | A1 | 1/2019 | |
| WO | 2019135319 | A1 | 7/2019 | |
| WO | 2019135320 | A1 | 7/2019 | |
| WO | 2019135328 | A1 | 7/2019 | |
| WO | 2019135348 | A1 | 7/2019 | |
| WO | 2020070956 | A1 | 4/2020 | |
| WO | 2020070957 | A1 | 4/2020 | |
| WO | 2020070958 | A1 | 4/2020 | |
| WO | WO-2020137026 | A1 * | 7/2020 | ............... C01F 17/36 |
| WO | WO-2020137156 | A1 * | 7/2020 | ............... C01F 17/36 |
| WO | WO-2020220697 | A1 * | 11/2020 | ............... C01F 17/36 |
| WO | 2021024783 | A1 | 2/2021 | |
| WO | 2021070595 | A1 | 4/2021 | |
| WO | 2021131716 | A1 | 7/2021 | |
| WO | 2021217045 | A1 | 10/2021 | |
| WO | 2022018946 | A1 | 1/2022 | |
| WO | 2022018952 | A1 | 1/2022 | |
| WO | 2022019098 | A1 | 1/2022 | |
| WO | 2022019099 | A1 | 1/2022 | |

OTHER PUBLICATIONS

Akihiro et al. (WO2020/137156 and using Machine Translation as English version) (Year: 2020).*

Huang et al. (CN110137561(A) and using Machine Translation as English version) (Year: 2019).*

Dongsu Park et al., "Theoretical Design of Lithium Chloride Superionic Conductors for All-Solid-State High-Voltage Lithium-Ion Batteries," ACS Applied Materials & Interfaces, Jul. 9, 2020, pp. 34806-34814, vol. 12.

Ionic radius, Wikipedia, pp. 1-10, Nov. 3, 2021, https://en.wikipedia.org/wiki/Ionic_radius.

Kern-Ho Park et al., "High-Voltage Superionic Halide Solid Electrolytes for All-Solid-State Li-Ion Batteries," ACS Energy Letters, Jan. 9, 2020, pp. 533-539, vol. 5.

Shuo Wang et al., "Lithium Chlorides and Bromides as Promising Solid-State Chemistries for Fast Ion Conductors with Good Electrochemical Stability," Communications, Li-Ion Batteries, May 15, 2019, pp. 8039-8043, vol. 58, With Supporting Information.

Tomita Yasumasa et al., "New Lithium Ion Conductor Li3InBr6 Studied by 7Li NMR," Chemistry Letters 1998, pp. 223-224, vol. 27, No. 3.

Xiaona Li et al., "Air-stable Li3InCl6 electrolyte with high voltage compatibility for all-solid-state batteries," Energy & Environmental Science, Aug. 28, 2019, pp. 1-7, Issue 9.

Y. Tomita et al., "Substitution Effect for Br on the Lithium Ion Conductivity of Lithium Indium Bromide," ECS Transactions, 2009, pp. 137-141, vol. 16, Issue 29.

Yasumasa Tomita et al., "Synthesis and Characterization of Lithium Ion Conductors, Li3InBr6 and Its Substituted Compounds," Defect and Diffusion Forum, Sep. 30, 2005, pp. 17-26, vols. 242-244.

Asano et al., "Solid Halide Electrolytes with High Lithium-Ion Conductivity for Application in 4 V Class Bulk-Type All-Solid-State Batteries", Advanced Materials, vol. 30, 2018, 1803075.

Tomita et al., "New Lithium Ion Conductor Li3InBr6Studied by 7Li NMR", Chemistry Letters, The Chemical Society of Japan, 1998, 223-224.

Tomita et al., "Substitution effect of ionic conductivity in lithium ion conductor, LI3INBR6-xCLx", Solid State Ionics, 179, 2008, 867-870.

Wang et al., "Lithium Chlorides and Bromides as Promising Solid-State Chemistries for Fast Ion Conductors with Good Electrochemical Stability", Angew. Chem. Int. Ed. 58, 2019, 8039-8043.

European Search Report for European Patent Application 21204943.1 dated Apr. 7, 2022.

Bohnsack et al., Ternare Halogenide vom Typ A3MX6. VII. Die Bromide Li3MBr6 (M=Sm-Lu, Y): Synthese, Kristallstrukturen und Ionenbeweglichkeit, Zeitschrift Fur Anorganische und Allgemeine Chemie, 1997, 623, 1352-56.

Bohnsack et al.,, Ternare Halogenide vom Typ A3MX6 VI. Ternare Chloride der Selten-Erd_Elemente mit Lithium, Li3MCl6 (M=Tb-Lu, Y, Sc): Synthese, Kristallstrukturen ind ionenbewegunig., Zeitschrift Fur Anorganische und Allgemeine Chemie, 1997, 623, 1067-73.

English Translation of Office Action issued Apr. 28, 2025, in corresponding KR Patent Application No. 10-2020-0081673, 8 pp.

Office Action issued Apr. 28, 2025, in corresponding KR Patent Application No. 10-2020-0081673, 9 pp.

* cited by examiner

SOLID ION CONDUCTOR COMPOUND, SOLID ELECTROLYTE COMPRISING THE SAME, ELECTROCHEMICAL CELL COMPRISING THE SAME, AND METHOD OF PREPARING THE SAME

CROSS-REFERENCE TO RELATED APPLICATION

This application is based on and claims priority to Korean Patent Application No. 10-2020-0151113, filed on Nov. 12, 2020, in the Korean Intellectual Property Office, and all the benefits accruing therefrom under 35 U.S.C. § 119, the content of which is incorporated by reference herein in its entirety.

BACKGROUND

1. Field

The present disclosure relates to a solid ion conductor compound, a solid electrolyte comprising the same, an electrochemical cell comprising the same, and a method of preparing the solid ion conductor compound.

2. Description of Related Art

An all-solid lithium battery includes a solid electrolyte as an electrolyte. An all-solid lithium battery has excellent stability because it does not contain a combustible organic solvent. Nonetheless, there remains a need for improved materials that provide improved conductivity or materials compatibility.

SUMMARY

An aspect is to provide a solid ion conductor compound having excellent lithium ionic conductivity.

Additional aspects will be set forth in part in the description which follows and, in part, will be apparent from the description, or may be learned by practice of the presented embodiments of the disclosure.

According to an aspect, provided is a solid ion conductor compound represented by Formula 1:

$$Li_xM1_aM2_bCl_yBr_z \qquad \text{Formula 1}$$

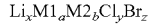

wherein M1 is an alkali metal, an alkaline earth metal, a transition metal, or a combination thereof,
M2 is one or more selected from lanthanide elements, $0<x<3.5$, $0\leq a<1.5$, $0<b<1.5$, $0<y<6$, $0<z<6$, and $0.166<y/z\leq 5$.

According to another aspect, provided is a solid electrolyte including a layer comprising the solid ion conductor.

According to still another aspect, provided is an electrochemical cell including: a positive electrode layer including a positive electrode active material layer, a negative electrode layer including a negative electrode active material layer, and an electrolyte layer located between the positive electrode layer and the negative electrode layer, wherein the positive electrode active material layer, the electrolyte layer, or a combination thereof includes the solid ion conductor.

Also disclosed is a protected positive electrode including: a current collector; a positive electrode layer including a positive electrode active material; and a protection layer comprising solid ion conductor compound on the positive electrode layer.

Also disclosed is a protected negative electrode including: a current collector; a negative electrode layer including a negative electrode active material; and a protection layer comprising solid ion conductor compound on the negative electrode layer.

According to still another aspect, provided is a method of preparing a solid ion conductor compound, the method including mixing a lithium precursor and a lanthanide-element-containing precursor to prepare a mixture, and treating the mixture to prepare the solid ion conductor.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
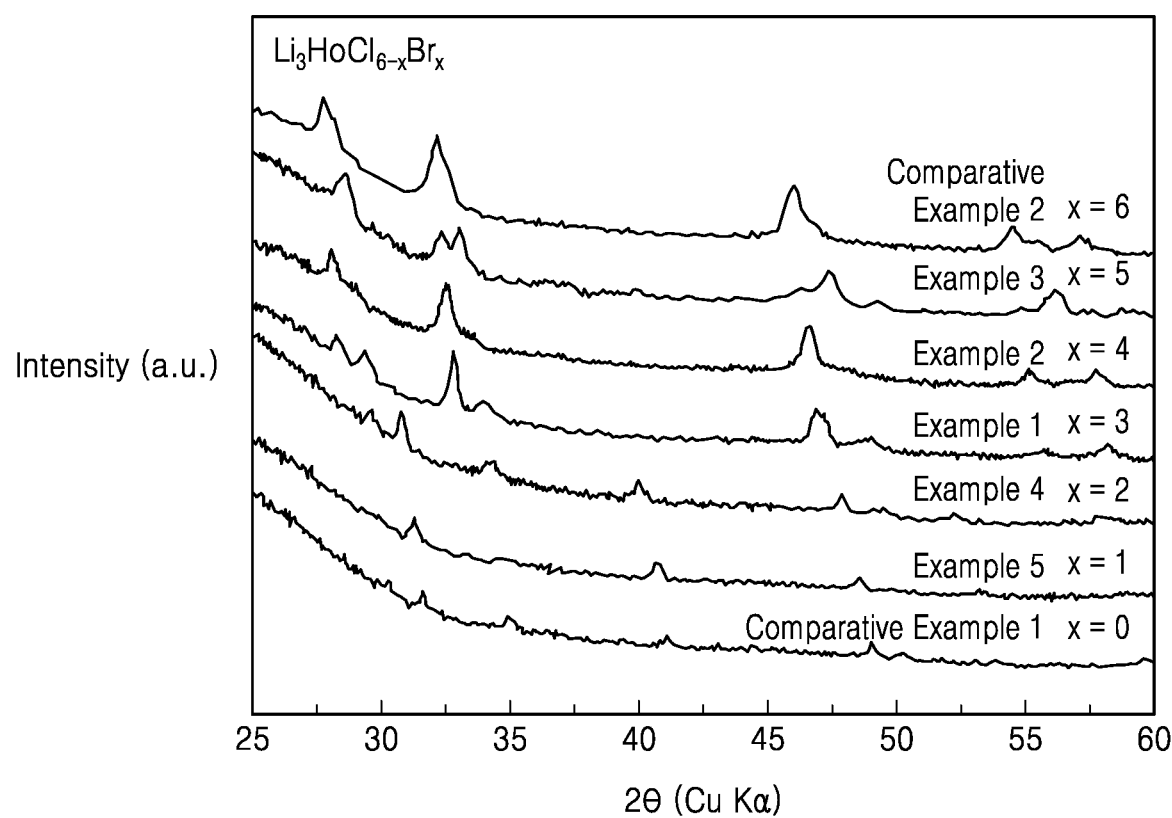
FIG. 1 is a graph of intensity (arbitrary units, a.u.) versus diffraction angle (degrees 2θ) and shows the results of X-ray diffraction analysis of Examples 1 to 5 and Comparative Examples 1 and 2.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Various example embodiments are shown in the accompanying drawings. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. Like numerals refer to like elements throughout.

It will be understood that when an element is referred to as being "on" another element, it can be directly on the other element or intervening elements may be present. In contrast, when an element is referred to as being "directly on" another element, there are no intervening elements.

It will be understood that, although the terms first, second, third, etc. may be used herein to describe various elements, components, regions, layers and/or sections, these elements, components, regions, layers and/or sections, should not be limited by these terms. These terms are only used to distinguish one element component, region, layer and/or section, from another. Thus, a first element, component, region, layer and/or section, discussed below could be termed a second element, component, region, layer and/or section, without departing from the teachings of the present inventive concept.

The terminology used herein is for the purpose of describing particular example embodiments only and is not intended to be limiting of the present inventive concept. The terminology used herein is for the purpose of describing particular embodiments only and is not intended to be limiting. As used herein, the singular forms are intended to include the plural forms including "at least one" as well, unless the context clearly indicates otherwise. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. In addition, a phrase "at least one" should not be construed as limited to be singular. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of inventive concepts are described herein with reference to cross-sectional illustrations that are schematic illustrations of idealized embodiments of example embodiments. As such, variations from the shapes of the illustrations as a result, for example, of manufacturing techniques and/or tolerances, are to be expected. Thus, example embodiments of inventive concepts should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

"Group" means a group of the periodic table of the elements according to the International Union of Pure and Applied Chemistry ("IUPAC") 1-18 Group classification system.

"Alkali metal" means a metal of Group 1 of the Periodic Table of the Elements, i.e., lithium, sodium, potassium, rubidium, cesium, and francium.

"Alkaline-earth metal" means a metal of Group 2 of the Periodic Table of the Elements, i.e., beryllium, magnesium, calcium, strontium, barium, and radium.

"Transition metal" as defined herein refers to an element of Groups 3 to 12 of the Periodic table.

The "lanthanide elements" means the chemical elements with atomic numbers 57 to 71.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

Hereinafter, a solid ion conductor compound, according to one or more exemplary embodiments, a solid electrolyte including the solid electrolyte, an electrochemical cell including the solid electrolyte, and a method of preparing the solid ion conductor compound will be described in more detail.

Solid Ion Conductor Compound

A solid ion conductor compound according to an aspect may be represented by Formula 1:

$$Li_xM1_aM2_bCl_yBr_z \qquad \text{Formula 1}$$

wherein M1 is an alkali metal, alkaline earth metal, a transition metal, or a combination thereof, M2 is one or more selected from lanthanide elements, $0<x<3.5$, $0\le a<1.5$, $0<b<1.5$, $0<y<6$, $0<z<6$, and $0.166<y/z\le 5$.

While not wanting to be bound by theory, it is understood that by including both of Cl and Br in the solid ion conductor compound, among halogen elements, the solid ion conductor compound represented by Formula 1 may have larger lithium migration channels resulting from an increased lattice size due to crystal lattice expansion, and thus may have improved lithium ionic conductivity.

In addition, referring to FIG. 1, it can be seen that the peak at about 35°2θ of Comparative Example 1 is shifted to a smaller diffraction angle upon introduction of Br, which is thought to be caused by lattice expansion.

In addition, since a crystallization temperature is lowered due to mixing of two kinds of halogen elements, synthesis under a moderate condition (that is, at low temperature) is facilitated, compared to a case where a single type of halogen element is included.

In addition, and while not wanting to be bound by theory, since a mole fraction (y/z) of Cl and Br in Formula 1 satisfies $0.166<y/z\le 5$, the activation energy of the ion conductor compound is reduced, thereby improving lithium ionic conductivity.

Furthermore, as the mole fraction of Br gradually increases, a proportion of amorphous phases in the compound is increased, thereby consequently further improving the lithium ionic conductivity.

In addition, by introducing a lanthanide element having a size selected for an octahedral site in a crystal structure of the solid ion conductor compound, the solid ion conductor compound has improved lithium ionic conductivity due to the reduced activation energy, compared to where a transition metal is contained therein. Additionally, by inclusion of a lanthanide element having a high reduction stability, reduction of the lanthanide element is suppressed, and thus decomposition of a solid electrolyte is suppressed, and a limiting current density is increased due to increased durability, and thus a high-rate characteristic is improved.

According to an embodiment, the solid ion conductor compound may have a layered rock-salt crystal structure. In an embodiment, the layered rock-salt crystal structure may include a distorted layered rock-salt crystal structure.

According to an embodiment, the solid ion conductor compound may include a first phase having a crystal structure belonging to a P3m1 space group. According to an embodiment, the solid ion conductor compound may include a first phase having a crystal structure belonging to a P3m1 space group and second phase having a crystal structure belonging to a C2/m space group. In an aspect, by including the first phase and the second phase, the solid ion conductor compound may have excellent lithium ionic conductivity.

According to an embodiment, the solid ion conductor compound may not exhibit a diffraction peak at about 40°2θ to about 44°2θ in an X-ray diffraction (XRD) spectrum, when analyzed using CuKα irradiation. Accordingly, lithium ion conductivity can be improved.

According to an embodiment, in Formula 1, M2 is a lanthanide element, and may be La, Ce, Pr, Nd, Pm, Sm, Eu, Gd, Tb, Dy, Ho, Er, Tm, Yb, Lu, or a combination thereof. Herein, the M2 may be a lanthanide element having an oxidation number of 3.

For example, the M2 may be La, Ho, Tm, Yb, Lu, or a combination thereof, but is not limited thereto.

According to an embodiment, in Formula 1, a satisfies $0<a<1.5$, and a portion of the Li crystallographic sites are occupied by M1. In an embodiment, in Formula 1, M1 may be doped into a lithium site in the crystal and arranged therein. A volume of the crystal lattice may be increased by introduction of M1, and thus migration resistance of lithium ions may be reduced, thereby improving lithium ionic conductivity.

In an embodiment, in Formula 1, a may be in a range of, but not limited to, $0<a\le 1.4$, $0<a\le 1.3$, $0<a\le 1.2$, $0<a\le 1.1$, $0<a\le 1$, $0<a\le 0.9$, $0<a\le 0.8$, $0<a\le 0.7$, $0<a\le 0.6$, $0<a\le 0.5$, $0<a\le 0.4$, $0<a\le 0.3$, $0<a\le 0.2$, or $0<a\le 0.1$, or $0.01<a\le 1.4$, $0.02<a\le 1.3$, $0.05<a\le 1.2$, $0.05<a\le 1.1$, $0.1<a\le 1$, or $0.01<a\le 0.1$, and the range of a may be selected in consideration of charge balancing of a compound without impairing lithium ionic conductivity of a solid ion conductor compound, for example, $0<a<0.1$. Any suitable combination of the upper and lower bounds may be used.

According to an embodiment, M1 may comprise Na, K, Rb, Cs, Fr, Be, Mg, Ca, Sr, Ba, Ra, Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Ti, Ge, Sn, Pb, Sb, Bi, Po, or a combination thereof. While not wanting to be bound by theory, it is understood that when both of M1 and M2 are included, migration resistance of lithium ions in the crystal may be reduced without crystal collapse, thereby further improving the lithium ionic conductivity.

According to an embodiment, in Formula 1, y and z may satisfy $1\le y\le 5$ and $1\le z\le 5$, respectively.

In an aspect, in Formula 1, y and z may satisfy $0.1<y\le 5$, $0.2<y\le 4$, $0.3<y\le 3$, $0.4<y\le 4$, or $0.5<y\le 5$. Also, $1<z\le 5.9$, $2<z\le 5.8$, $3<z\le 5.7$, $4<z\le 5.6$, or $5<z\le 5.5$. By inclusion of the halogen elements of a molar ratio satisfying the above range, a crystallization temperature may be lowered, and thus synthesis at low temperature is facilitated, and ionic conductivity may be increased by increased lattice sizes.

According to an embodiment, $2.5<x<3.5$, $2<y<5$, and $5.4<(x+y)<6.6$. For example, $2.7<x<3.3$, $2.5<y<5$, and $5.7<(x+y)<6.3$.

According to an embodiment, $0.1<b\le 1.5$, $0.2<b\le 1.4$, $0.3<b\le 1.3$, $0.4<b\le 1.2$, or $0.5<b\le 1.1$, or $b=1$.

According to an embodiment, in Formula 1, y=z. For example, y and z each may be 3. When Cl and Br are in the same mole fraction, activation energy may be reduced according to lattice expansion of the solid ion conductor compound, thereby noticeably improving lithium ionic conductivity.

According to an embodiment, y and z in Formula 1 may satisfy the condition: $0.166<y/z<5$. For example, $0.166<y/z\le 3$ or $0.166<y/z\le 2$.

According to an embodiment, y and z in Formula 1 may satisfy the condition: $0.16<z/(y+z)<0.85$. For example, $0.16<z/(y+z)<0.84$, $0.16<z/(y+z)<0.67$, $0.16<z/(y+z)<0.55$, $0.16<z/(y+z)\le 0.5$, or $0.16<z/(y+z)<0.34$.

According to an embodiment, in Formula 1, $1<z<6$, and the solid ion conductor compound may include a first phase having a crystal structure belonging to a P3m1 space group and a second phase having a crystal structure belonging to a C2/m space group. Accordingly, the solid ion conductor compound may have improved lithium ionic conductivity.

According to an embodiment, the Formula 1 may be represented by Formula 2:

$$Li_{3-a}M1_aM2_bCl_yBr_z \quad \text{Formula 2}$$

wherein in Formula 2,
M1 is an alkali metal, an alkaline earth metal, a transition metal, or a combination thereof, M2 is a lanthanide element, or a combination thereof,
$0\le a<1.5$, $0<b<1.5$, $0<y<6$, $0<z<6$, and $0.166<y/z\le 5$.

According to an embodiment, the solid ion conductor compound may comprise: $Li_xHoCl_yBr_z$ (where $0<x<3.5$, $0<y<6$, $0<z<6$, and $0.166<y/z\leq5$), $Li_xCeCl_yBr_z$ (where $0<x<3.5$, $0<y<6$, $0<z<6$, and $0.166<y/z\leq5$), $Li_xPrCl_yBr_z$ (where $0<x<3.5$, $0<y<6$, $0<z<6$, and $0.166<y/z\leq5$), $Li_xNdCl_yBr_z$ (where $0<x<3.5$, $0<y<6$, $0<z<6$, and $0.166<y/z\leq5$), $Li_xPmCl_yBr_z$ (where $0<x<3.5$, $0<y<6$, $0<z<6$, and $0.166<y/z\leq5$), $Li_xSmCl_yBr_z$ (where $0<x<3.5$, $0<y<6$, $0<z<6$, and $0.166<y/z\leq5$), $Li_xEuCl_yBr_z$ (where $0<x<3.5$, $0<y<6$, $0<z<6$, and $0.166<y/z\leq5$), $Li_xGdCl_yBr_z$ (where $0<x<3.5$, $0<y<6$, $0<z<6$, and $0.166<y/z\leq5$), $Li_xTbCl_yBr_z$ (where $0<x<3.5$, $0<y<6$, $0<z<6$, and $0.166<y/z\leq5$), $Li_xDyCl_yBr_z$ (where $0<x<3.5$, $0<y<6$, $0<z<6$, and $0.166<y/z\leq5$), $Li_xErCl_yBr_z$ (where $0<x<3.5$, $0<y<6$, $0<z<6$, and $0.166<y/z\leq5$), $Li_xTmCl_yBr_z$ (where $0<x<3.5$, $0<y<6$, $0<z<6$, and $0.166<y/z\leq5$), $Li_xYbCl_yBr_z$ (where $0<x<3.5$, $0<y<6$, $0<z<6$, and $0.166<y/z\leq5$), $Li_xLuCl_yBr_z$ (where $0<x<3.5$, $0<y<6$, $0<z<6$, and $0.166<y/z\leq5$), $Li_xM1_aHoCl_yBr_z$ (where $0<x<3.5$, $0\leq a<1.5$, $0<y<6$, $0<z<6$, and $0.166<y/z\leq5$), $Li_xM1_aCeCl_yBr_z$ (where $0<x<3.5$, $0\leq a<1.5$, $0<y<6$, $0<z<6$, and $0.166<y/z\leq5$), $Li_xM1_aPrCl_yBr_z$ (where $0<x<3.5$, $0\leq a<1.5$, $0<y<6$, $0<z<6$, and $0.166<y/z\leq5$), $Li_xM1_aNdCl_yBr_z$ (where $0<x<3.5$, $0\leq a<1.5$, $0<y<6$, $0<z<6$, and $0.166<y/z\leq5$), $Li_xM1_aPmCl_yBr_z$ (where $0<x<3.5$, $0\leq a<1.5$, $0<y<6$, $0<z<6$, and $0.166<y/z\leq5$), $Li_xM1_aSmCl_yBr_z$ (where $0<x<3.5$, $0\leq a<1.5$, $0<y<6$, $0<z<6$, and $0.166<y/z\leq5$), $Li_xM1_aEuCl_yBr_z$ (where $0<x<3.5$, $0\leq a<1.5$, $0<y<6$, $0<z<6$, and $0.166<y/z\leq5$), $Li_xM1_aGdCl_yBr_z$ (where $0<x<3.5$, $0\leq a<1.5$, $0<y<6$, $0<z<6$, and $0.166<y/z\leq5$), $Li_xM1_aTbCl_yBr_z$ (where $0<x<3.5$, $0\leq a<1.5$, $0<y<6$, $0<z<6$, and $0.166<y/z\leq5$), $Li_xM1_aDyCl_yBr_z$ (where $0<x<3.5$, $0\leq a<1.5$, $0<y<6$, $0<z<6$, and $0.166<y/z\leq5$), $Li_xM1_aErCl_yBr_z$ (where $0<x<3.5$, $0\leq a<1.5$, $0<y<6$, $0<z<6$, and $0.166<y/z\leq5$), $Li_xM1_aTmCl_yBr_z$ (where $0<x<3.5$, $0\leq a<1.5$, $0<y<6$, $0<z<6$, and $0.166<y/z\leq5$), $Li_xM1_aYbCl_yBr_z$ (where $0<x<3.5$, $0\leq a<1.5$, $0<y<6$, $0<z<6$, and $0.166<y/z\leq5$), or $Li_xM1_aLuCl_yBr_z$ (where $0<x<3.5$, $0\leq a<1.5$, $0<y<6$, $0<z<6$, and $0.166<y/z\leq5$), wherein M1 may independently comprise an alkali metal, an alkali earth metal, a transition metal, or a combination thereof. In an aspect, a combination comprising at least one of the foregoing may be used.

According to an embodiment, the solid ion conductor compound may have an ionic conductivity of $10^{-4}$ S/cm or greater at room temperature, for example, 20° C. For example, the solid ion conductor compound may have, at 20° C., an ionic conductivity of $1.8\times10^{-4}$ S/cm or greater, $1.9\times10^{-4}$ S/cm or greater, $2.0\times10^{-4}$ S/cm or greater, $2.5\times10^{-4}$ S/cm or greater, $3.0\times10^{-4}$ S/cm or greater, $3.5\times10^{-4}$ S/cm or greater, $4.0\times10^{-4}$ S/cm or greater, $4.5\times10^{-4}$ S/cm or greater, $5.0\times10^{-4}$ S/cm or greater, or $5.5\times10^{-4}$ S/cm or greater.

Figure 2:
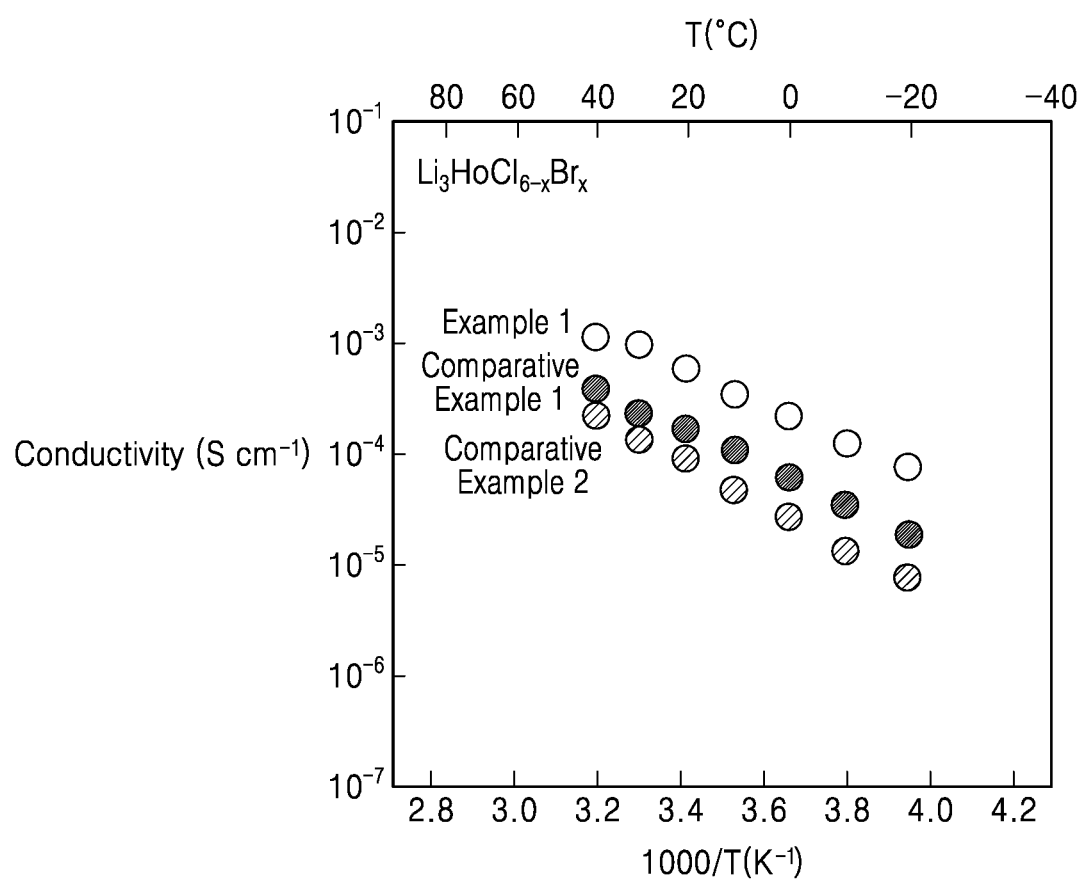
FIG. 2 is a graph of conductivity (siemens per centimeter, $Scm^{-1}$) versus temperature (° C. upper axis, 1000/K lower axis) and shows the results of EIS evaluation of the solid ion conductor prepared in Example 1 and Comparative Examples 1 and 2.

According to an embodiment, the solid ion conductor compound may have an ionic conductivity of $10^{-4}$ S/cm or greater at −20° C. to 40° C., which can be confirmed by the results shown in the graph shown in FIG. 2. The solid ion conductor compound exhibits ionic conductivity which is suitable for use in an electrochemical cell from a low temperature (−20° C.) to a high temperature (40° C.), and thus can be applied in a variety of temperature environments.

Solid Electrolyte

A solid electrolyte according to an aspect includes the solid ion conductor. The solid electrolyte has a high ionic conductivity and a high chemical stability by including the solid ion conductor. The solid electrolyte including the solid ion conductor compound may provide improved stability with respect to the air and may provide electrochemical stability with respect to a lithium metal. Therefore, the solid ion conductor compound may be used as a solid electrolyte of, for example, an electrochemical cell. The solid electrolyte may comprise or be in a form of a layer comprising solid ion conductor.

The solid electrolyte may additionally include an additional solid electrolyte in addition to the solid ion conductor. For example, the solid electrolyte may additionally include a sulfide-based solid electrolyte and/or oxide-based solid electrolyte. Examples of the sulfide-based solid electrolyte may include at least one of $Li_2S-P_2S_5$, $Li_2S-P_2S_5-LiX$ (where X is a halogen element), $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (where m and n each are a positive number, Z represents any of Ge, Zn, and Ga), $Li_2S-GeS_2$, $Li_2S-SiS_2-Li_3PO_4$, $Li_2S-SiS_2-Li_pMO_q$ (where p and q each are a positive number, M represents at least one of P, Si, Ge, B, Al, Ga, or In), $Li_{7-x}PS_{6-x}Cl_x$ (where $0\leq x\leq2$), $Li_{7-x}PS_{6-x}Br_x$ (where $0\leq x\leq2$), or $Li_{7-x}PS_{6-x}I_x$ (where $0\leq x\leq2$). Examples of the oxide-based solid electrolyte may include at least one of $Li_{1+x+y}Al_xTi_{2-x}Si_yP_{3-y}O_{12}$ (where $0<x<2$ and $0\leq y<3$), $BaTiO_3$, $Pb(Zr_aTi_{1-a})O_3$ (PZT) (where $0\leq a\leq1$), $Pb_{1-x}La_xZr_{1-y}Ti_yO_3$ (PLZT) (where $0\leq x<1$ and $0\leq y<1$), $Pb(Mg_{1/3}Nb_{2/3})O_3-PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ (where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0\leq x\leq1$, $0\leq y\leq1$, $0\leq a\leq1$, and $0\leq b\leq1$), $Li_xLa_yTiO_3$ (where $0<x<2$ and $0<y<3$), $Li_2O$, $LiOH$, $Li_2CO_3$, $LiAlO_2$, $Li_2O-Al_2O_3-SiO_2-P_2O_5-TiO_2-GeO_2$, or $Li_{3+x}La_3M_2O_{12}$ (where M is Te, Nb, or Zr, and $0\leq x\leq10$). The solid electrolyte additionally included may include, for example, $Li_2O-Al_2O_3-TiO_2-P_2O_5$(LATP), lithium super ionic conductor (LISICON) as well known in the art, LIPON ($Li_{3-y}PO_{4-x}N_x$, $0<y<3$, $0<x<4$), thio-LISICON (such as $Li_{3.25}Ge_{0.25}P_{0.75}S_4$), $Li_2S$, $Li_2S-P_2S_5$, $Li_2S-SiS_2$, $Li_2S-GeS_2$, $Li_2S-B_2S_5$, and $Li_2S-Al_2S_5$, or any other suitable material that is used in the art.

The solid electrolyte may be in the form of powder or a molded article. The solid electrolyte in the form of a molded article may have a shape of, for example, but not limited to, a pellet, a sheet, or a thin film, or layer, and may have any of various forms, according to uses thereof.

Electrochemical Cell

An electrochemical cell according to another embodiment includes: a positive electrode layer including a positive electrode active material layer; a negative electrode layer including a negative electrode active material layer; and an electrolyte layer located between the positive electrode layer and the negative electrode layer, wherein the positive electrode active material layer and/or the electrolyte layer include the above-described solid ion conductor. By inclusion of the solid ion conductor, the electrochemical cell has improved lithium ionic conductivity and chemical stability.

For example, the electrochemical cell may include, but not limited to, an all-solid secondary battery, a liquid electrolyte containing secondary battery, or a lithium air battery.

Hereinafter, an all-solid secondary battery will be described in greater detail.

All Solid Secondary Battery: First Type

The all-solid secondary battery may include the solid ion conductor.

For example, the all-solid secondary battery may include: a positive electrode layer including a positive electrode active material layer; a negative electrode layer including a negative electrode active material layer; and an electrolyte layer located between the positive electrode layer and the negative electrode layer, wherein the positive electrode active material layer and/or the electrolyte layer may include the solid ion conductor.

An all-solid secondary battery according to an embodiment may be prepared in the following manner.

Solid Electrolyte Layer

First, a solid electrolyte layer is prepared.

The solid electrolyte layer may be prepared by mixing the solid ion conductor compound with a binder and drying the mixture, or rolling a powder of the solid ion conductor compound represented by Formula 1 in a form, such as a die, with a pressure of 1 to 10 tons. The solid ion conductor compound may be used to provide a solid electrolyte.

The solid electrolyte may have an average particle diameter of, for example, about 0.5 micrometers (μm) to about 20 μm. Since the solid electrolyte has such an average particle diameter in the above range, adhesion thereof may be improved during a process of forming a sintered body, thereby improving ionic conductivity and life characteristics of solid electrolyte particles.

The solid electrolyte layer may have a thickness of about 10 μm to about 200 μm. Since the solid electrolyte layer has such a thickness in the above range, sufficient migration speed of lithium ions may be provided, thereby consequently attaining high ionic conductivity.

The solid electrolyte layer may further include an additional solid electrolyte, such as the sulfide-based solid electrolyte and/or the oxide-based solid electrolyte, in addition to the solid ion conductor.

The additional sulfide-based solid electrolyte may include, for example, lithium sulfide, silicon sulfide, phosphorus sulfide, boron sulfide, or a combination thereof. Particles of the additional sulfide-based solid electrolyte may include $Li_2S$, $P_2S_5$, $SiS_2$, $GeS_2$, $B_2S_3$, or a combination thereof. The additional sulfide-based solid electrolyte particles may include $Li_2S$ or $P_2S_5$. The sulfide-based solid electrolyte particles may provide higher lithium ionic conductivity than other inorganic compounds. For example, the sulfide-based solid electrolyte may include $Li_2S$ and $P_2S_5$. When a sulfide-based solid electrolyte material constituting the sulfide-based solid electrolyte includes $Li_2S$—$P_2S_5$, a molar ratio of $Li_2S$ and $P_2S_5$ may be, for example, about 50:50 to about 90:10. In addition, an inorganic solid electrolyte, prepared by adding $Li_3PO_4$, halogen, a halogen compound, $Li_{2+2x}Zn_{1-x}GeO_4$ ("LISICON"), $Li_{3+y}PO_{4-x}N_x$ ("LIPON"), $Li_{3.25}Ge_{0.25}P_{0.75}S_4$ ("ThioLISICON"), or $Li_2O$—$Al_2O_3$—$TiO_2$—$P_2O_5$ ("LATP") to an inorganic solid electrolyte, such as $Li_2S$—$P_2S_5$, $SiS_2$, $GeS_2$, $B_2S_3$, or a combination thereof, may be used as the sulfide solid electrolyte. Non-limiting examples of the sulfide solid electrolyte material may include: $Li_2S$—$P_2S_5$; $Li_2S$—$P_2S_5$—LiX (where X is a halogen element); $Li_2S$—$P_2S_5$—$Li_2O$; $Li_2S$—$P_2S_5$—$Li_2O$—LiI; $Li_2S$—$SiS_2$; $Li_2S$—$SiS_2$—LiI; $Li_2S$—$SiS_2$—LiBr; $Li_2S$—$SiS_2$—LiCl; $Li_2S$—$SiS_2$—$B_2S_3$—LiI; $Li_2S$—$SiS_2$—$P_2S_5$—LiI; $Li_2S$—$B_2S_3$; $Li_2S$—$P_2S_5$—$Z_mS_n$ (where m and n are each a positive number, and Z is Ge, Zn or G); $Li_2S$—$GeS_2$; $Li_2S$—$SiS_2$—$Li_3PO_4$; and $Li_2S$—$SiS_2$—$Li_pMO_q$ (where p and q are each a positive number, and M is P, Si, Ge, B, Al, Ga, or In). In this regard, the sulfide-based solid electrolyte material may be prepared by subjecting a starting material thereof, such as $Li_2S$ and $P_2S_5$ to a melt quenching or a mechanical milling. In addition, a calcination process may be performed after the melt quenching or a mechanical milling.

In an aspect, a binder included in the solid electrolyte layer may include, but is not limited to, styrene butadiene rubber (SBR), polytetrafluoroethylene, polyvinylidene fluoride, polyethylene, and polyvinyl alcohol, or any suitable any material that is used as a binder in the art. The binder of the solid electrolyte layer may be the same as or different from that of the positive electrode layer or the negative electrode layer.

Positive Electrode Layer

Next, a positive electrode layer is prepared.

The positive electrode layer may be prepared by forming a positive electrode active material layer including a positive electrode active material on a current collector. The positive electrode active material may have an average particle diameter of, for example, about 2 μm to about 10 μm.

As the positive electrode active material, any suitable material may be used. For example, the positive electrode active material may be a lithium transition metal oxide or a lithium transition metal sulfide. For example, a composite oxide of lithium and a metal of at least one of cobalt, manganese, nickel, or a combination thereof may be used as the positive electrode active material. Non limiting example of the positive electrode active material may be a compound represented by any of the Formulas: $Li_aA_{1-b}B^1_bD^1_2$ (where $0.90 \leq a \leq 1.8$ and $0 \leq b \leq 0.5$); $Li_aE_{1-b}B^1_bO_{2-c}D^1_c$ (where $0.90 \leq a \leq 1.8$, $0 \leq b \leq 0.5$, and $0 \leq c \leq 0.05$); $LiE_{2-b}B^1_bO_{4-c}D^1_c$ (where $0 \leq b \leq 0.5$ and $0 \leq c \leq 0.05$); $Li_aNi_{1-b-c}Co_bB^1_cD^1_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB^1_cO_{2-\alpha}F^1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB^1_cO_{2-\alpha}F^1_\alpha$ (where $0.90 \leq a \leq 1.8$, $0 \leq b \leq 0.5$, $0 \leq c \leq 0.05$, and $0 < \alpha <$); $Li_aNi_{1-b-c}Mn_bB^1_cD^1_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB^1_cO_{2-\alpha}F^1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1_cO_{2-\alpha}F^1_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); or $Li_{(3-f)}Fe_2(PO_4)_3$ (where $0 \leq f \leq 2$); and $LiFePO_4$. In the above formulas, A is Ni, Co, Mn, or a combination thereof; $B^1$ Al, Ni, Co, Mn, Cr, Fe, Mg, Sr, V, a rare-earth element, or a combination thereof; $D^1$ is O, F, S, P, or a combination thereof; E is Co, Mn, or a combination thereof; $F^1$ is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof. For example, the composite oxide may be $LiCoO_2$, $LiMn_xO_{2x}$ (where x is 1 or 2), $LiNi_{1-x}Mn_xO_{2x}$ (where $0 < x < 1$), $Ni_{1-x-y}Co_xMn_yO_2$ (where $0 \leq x \leq 0.5$ and $0 \leq y \leq 0.5$), $Ni_{1-x-y}Co_xAl_yO_2$ (where $0 \leq x \leq 0.5$ and $0 \leq y \leq 0.5$), $LiFePO_4$, $TiS_2$, $FeS_2$, $TiS_3$, or $FeS_3$.

The compound having a coating layer on the surface thereof, or a mixture of the compound without a coating layer and a compound having a coating layer may also be used. The coating layer may include, for example, a compound of a coating element, such as an oxide, hydroxide, oxyhydroxide, oxycarbonate, or hydroxycarbonate of the coating element. The compound constituting the coating layer may be amorphous or crystalline. The coating element included in the coating layer may be Mg, Al, Co, K, Na, Ca, Si, Ti, V, Sn, Ge, Ga, B, As, Zr, or a combination thereof.

Any suitable coating method, which does not adversely affect physical properties of the positive electrode active material may be used for forming the coating layer. The coating method may be, for example, spray coating, or dipping. Since specific coating methods are well understood to those skilled in the art, detailed description thereof will not be further elaborated upon, and the details can be determined by one of skill in the art without undue experimentation.

The positive electrode active material includes, for example, a lithium transition metal oxide having a layered rock salt type structure. The "layered rock salt type structure" refers to a structure in which oxygen layers and metal atom layers are alternately regularly arranged in a direction of a<111> plane having, for example, a cubic rock salt type structure, and thus the respective atom layers form a two-dimensional plane. The "cubic rock salt type structure" corresponds to a sodium chloride type structure (NaCl type), which is a kind of crystal structure, specifically, a structure in which a face-centered cubic lattice, respectively form of anions and cations such that the cations are in a face-centered cubic (FCC) arrangement, with anions occupying the octahedral holes. The lithium transition metal oxide having the layered rock salt type may include, for example, a ternary lithium transition metal oxide, such as $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the positive electrode active material includes a ternary lithium transition metal oxide having a layered rock salt type, the all-solid secondary battery 1 may have further improved energy density and thermal stability.

As described above, the positive electrode active material may be covered by a protection layer, e.g., coating layer. As the protection layer, any suitable protection layer for a positive electrode active material for an all-solid secondary battery in the art, may be used. For example, the coating layer may be formed of $Li_2O$—$ZrO_2$ (LZO). In an aspect, the protection layer comprises the solid ion conductor. Disclosed is a protected positive electrode layer comprising a current collector, the positive active material layer, and the protection layer comprising the solid ion conductor on the positive active material layer.

When the positive electrode active material includes, for example, nickel (Ni) in a ternary lithium transition metal oxide, such as NCA or NCM, the capacity density of an all-solid secondary battery may be increased, and thus elution of metal in the positive electrode active material may be suppressed in a charged state. As a result, cycle characteristics of the all-solid secondary battery may be improved.

The positive electrode active material may have a particulate shape of, for example, a true sphere. A particle diameter of the positive electrode active material is not particularly limited, and may be in the range that can be applied to a positive electrode active material of an all-solid secondary battery. A content of the positive electrode active material of the positive electrode layer is not particularly limited, and may be in the range that can be applied to a positive electrode layer of an all-solid secondary battery. In the positive electrode active material layer, the content of the positive electrode active material may be in a range of, for example, about 50 weight percent (wt %) to about 95 wt %, based on a total weight of the positive electrode active material layer.

The positive electrode active material layer may additionally include the solid ion conductor. For example, both of the positive electrode active material layer and the solid electrolyte layer may include the solid ion conductor. For example, when the positive electrode active material layer includes the solid ion conductor, the solid electrolyte layer may not include the solid ion conductor.

The positive electrode active material layer may include a binder. The binder may include, for example, styrene butadiene rubber (SBR), polytetrafluoroethylene, polyvinylidene fluoride, or polyethylene.

The positive electrode active material layer may include a conductive agent. The conductive agent may include, for example, graphite, carbon black, acetylene black, Ketjen black, carbon fiber, or a metal powder.

The positive electrode active material layer may further include, for example, additives, such as a filler, a coating agent, a dispersing agent, an ion-conductive agent, and the like in addition to the positive electrode active material, the solid electrolyte, the binder, and the conductive agent.

As the filler, the coating agent, the dispersing agent, and the ion-conductive agent, included in the positive electrode active material layer, other suitable materials used in an electrode of an all-solid secondary battery may be used.

The positive electrode current collector may be, for example, a plate or foil that is formed of aluminum (Al), indium (In), copper (Cu), magnesium (Mg), stainless steel, titanium (Ti), iron (Fe), cobalt (Co), nickel (Ni), zinc (Zn), germanium (Ge), lithium (Li), or an alloy thereof. The positive electrode current collector may be omitted.

The positive electrode current collector may further include a carbon layer disposed on one surface or both surfaces of a metal substrate. By further including the carbon layer on the metal substrate, a metal of the metal substrate may prevent corrosion due to a solid electrolyte included in the positive electrode layer and may reduce interface resistance between the positive electrode active material layer and the positive electrode current collector. The carbon layer may have a thickness of, for example, about 1 μm to about 5 μm. If the thickness of the carbon layer is too small, it may be difficult to completely prevent the metal substrate and the solid electrolyte from contacting each other. If the thickness of the carbon layer is too large, the energy density of all-solid secondary battery may be lowered. The carbon layer may include amorphous carbon or crystalline carbon.

Negative Electrode Layer

The negative electrode layer may be prepared using the same method used to prepare the positive electrode layer, except that a negative active material is used instead of the positive active material. The negative electrode layer may be prepared by forming a negative electrode active material layer including a negative electrode active material on a negative electrode current collector.

The negative electrode active material layer may further include the above-described solid ion conductor.

The negative electrode active material may comprise lithium metal, a lithium metal alloy, or a combination thereof.

The negative electrode active material layer may further include a negative electrode active material other than lithium metal or a lithium metal alloy, in addition to lithium metal, a lithium metal alloy, or a combination thereof. The negative electrode active material may include, for example, at least one of a metal that is alloyable with lithium, a transition metal oxide, a non-transition metal oxide, or a carbon-based material. Examples of the metal that is alloyable with lithium may include Ag, Si, Sn, Al, Ge, Pb, Bi, Sb Si—Y' alloy (where Y' is an alkali metal, an alkaline earth metal, a Group 13 element, a Group 14 element, a transition metal, a rare-earth element or a combination thereof, and is not Si), and an Sn—Y' alloy (where Y' is an alkali metal, an alkaline earth metal, a Group 13 element, a Group 14 element, a transition metal, a rare-earth element, or a combination thereof, and is not Sn). The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. Examples of the transition metal oxide may include lithium titanium oxide, vanadium oxide, and lithium vanadium oxide. Examples of the non-transition metal oxide may include $SnO_2$, or $SiO_x$ (where $0<x<2$). Examples of the carbon-based material include crystalline carbon, amorphous carbon, or a mixtures thereof. Examples of the crystalline carbon may include natural graphite and artificial graphite, each of which may have an amorphous shape, a plate shape, a flake shape, a spherical shape, or a fiber shape, and examples of the amorphous carbon include soft carbon (low-temperature calcined carbon), hard carbon, mesophase pitch carbide, or calcined coke.

Figure 8:
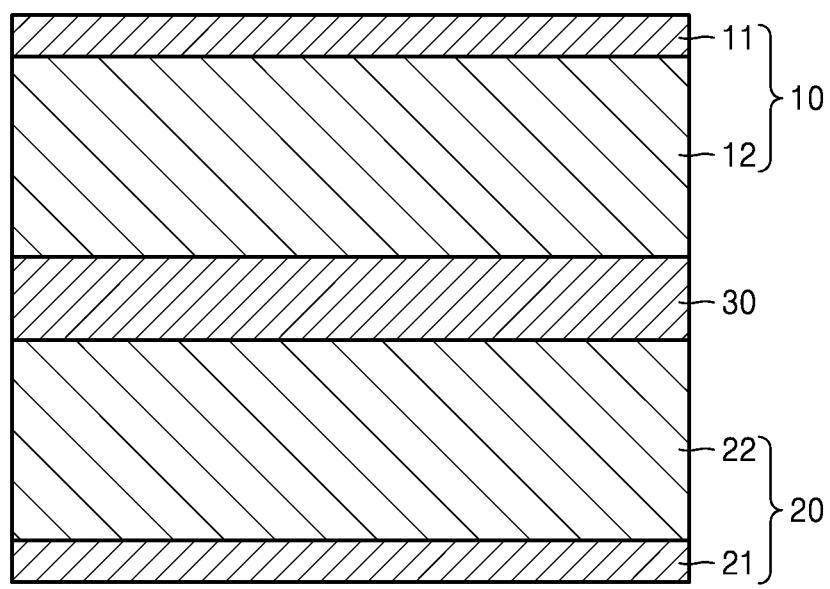
FIG. 8 is a schematic view of an embodiment of an all-solid secondary battery.

Referring to FIG. 8, an all-solid secondary battery 40 according to an embodiment includes a solid electrolyte layer 30, a positive electrode layer 10 disposed on one surface of the solid electrolyte layer 30, and a negative electrode layer 20 disposed on the other surface of the solid electrolyte layer 30. The positive electrode layer 30 includes a positive electrode active material layer 12 contacting the solid electrolyte layer 30, and a positive electrode current collector 11 contacting the positive electrode active material layer 12, and the negative electrode layer 20 includes a negative electrode active material layer 22 contacting the solid electrolyte layer 30, and a negative electrode current collector 21 contacting the negative electrode active material layer 22. The all-solid secondary battery 40 may be prepared by, for example, forming the positive electrode active material layer 12 and the negative electrode active material layer 22 on both surfaces of the solid electrolyte layer 30, and forming the positive electrode current collector 11 and the negative electrode current collector 21 on the positive electrode active material layer 12 and the negative electrode active material layer 22, respectively. In another example, the all-solid secondary battery 40 is prepared by, for example, sequentially stacking the negative electrode active material layer 22, the solid electrolyte layer 30, the positive electrode active material layer 12, and the positive electrode current collector 11 on the negative electrode current collector 21.

All Solid Secondary Battery: Second Type

Figure 9:
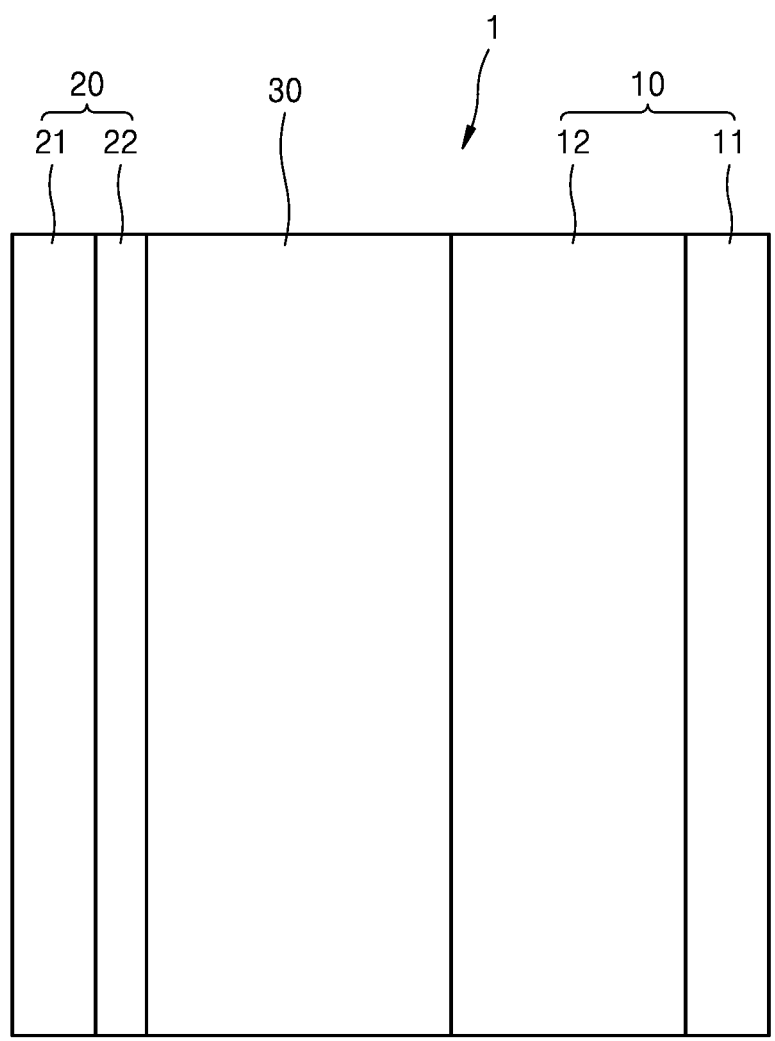
FIG. 9 is a schematic view of another embodiment of an all-solid secondary battery.
Figure 10:
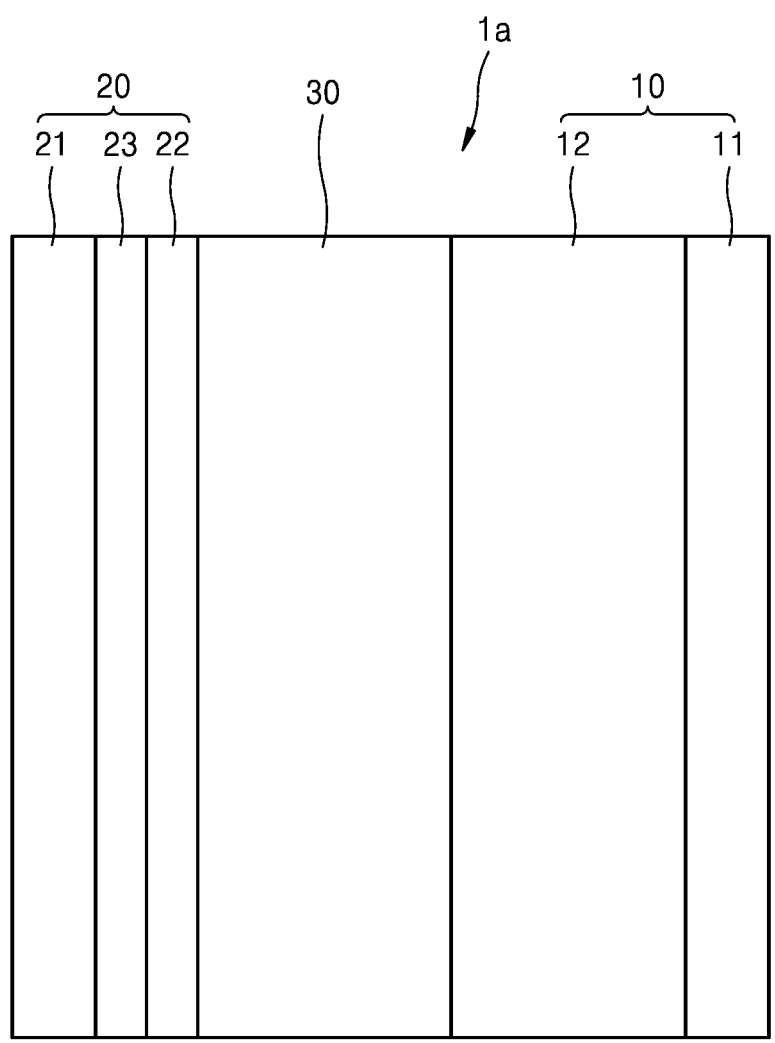
FIG. 10 is a schematic view of another embodiment of an all-solid secondary battery.

Referring to FIGS. 9 and 10, the all-solid secondary battery 1 may include, for example, a positive electrode layer 10 including a positive electrode active material layer 12 disposed on a positive electrode current collector 11; a negative electrode layer 20 including a negative electrode active material layer 22 disposed on a negative electrode current collector 21; and an electrolyte layer 30 disposed between the positive electrode layer 10 and the negative electrode layer 20, and the positive electrode active material layer 12 and/or the electrolyte layer 30 may include the solid ion conductor.

An all-solid secondary battery according to another embodiment may be prepared in the following manner.

The positive electrode layer and the solid electrolyte layer may be prepared in the same manner as the all-solid secondary battery.

Negative Electrode Layer

Next, a negative electrode layer is prepared.

Referring to FIGS. 9 and 10, the negative electrode layer 20 includes a negative electrode current collector 21 and a negative electrode active material layer 22 disposed on the negative electrode current collector 21, and the negative electrode active material layer 22 may include, for example, a negative electrode active material and a binder.

The negative electrode active material included in the negative electrode active material layer 22 may have a particulate shape. The negative electrode active material having a particulate shape may have an average particle diameter of, for example, about 4 μm or less, about 3 μm or less, about 2 μm or less, about 1 μm or less, or about 900 nanometers (nm) or less. The average particle diameter of the negative electrode active material having a particulate shape may be, for example, about 10 nm to about 4 μm or less, about 10 nm to about 3 μm or less, about 10 nm to about 2 μm or less, about 10 nm to about 1 μm or less, or about 10 nm to about 900 nm or less. By having an average particle size in such a range, the negative electrode active material may further facilitate reversible absorbing and/or desorbing of lithium during charge and discharge. The average particle size of the negative electrode active material is, for example, a median diameter (D50) measured by using a particle size distribution meter by laser light scattering.

The negative electrode active material, e.g., included in the negative electrode active material layer 22, may include, for example, a carbon-based negative electrode active material, or a metal or a metalloid negative electrode active materials.

The carbon-based negative electrode active material may comprise amorphous carbon. The amorphous carbon may be, for example, carbon black (CB), acetylene black (AB), furnace black (FB), Ketjen black (KB), or graphene but is not limited thereto, and any suitable amorphous carbon may be used. The amorphous carbon is carbon with no or very low crystallinity, which is distinguished from crystalline carbon or graphite carbon.

The metal or metalloid negative electrode active material may include comprise gold (Au), platinum (Pt), palladium (Pd), silicon (Si), silver (Ag), aluminum (Al), bismuth (Bi), tin (Sn), or zinc (Zn), but is not limited thereto, and any suitable metal negative electrode active material or metalloid negative electrode active material that can suitably form an alloys or compounds with lithium in the art may be used. For example, nickel (Ni) is not a metal negative electrode active material because nickel (Ni) does not form an alloy with lithium.

The negative electrode active material layer may comprise a negative electrode active material of these negative electrode active materials or include a mixture of a plurality of different negative electrode active materials. For example, the negative electrode active material layer 22 may include only amorphous carbon or may comprise gold (Au), platinum (Pt), palladium (Pd), silicon (Si), silver (Ag), aluminum (Al), bismuth (Bi), tin (Sn), or zinc (Zn). In another example, the negative electrode active material layer 22 includes a mixture of the amorphous carbon and gold (Au), platinum (Pt), palladium (Pd), silicon (Si), silver (Ag), aluminum (Al), bismuth (Bi), tin (Sn), or zinc (Zn). A mixing ratio of the mixture of the amorphous carbon and gold or the like is, for example, about 10:1 to about 1:2, about 5:1 to about 1:1, or about 4:1 to about 2:1 by weight, but is not limited to such a range, and may be selected depending on desired characteristics of the all-solid secondary battery. By having such a composition, the negative electrode active material may further improve cycle characteristics of the all-solid secondary battery.

The negative electrode active material included in the negative electrode active material layer 22 may include, for example, a mixture of first particles including amorphous carbon and second particles including the metal or metalloid. The metal or metalloid includes, for example, gold (Au), platinum (Pt), palladium (Pd), silicon (Si), silver (Ag), aluminum (Al), bismuth (Bi), tin (Sn), or zinc (Zn). The metalloid is alternatively a semiconductor. The amount of the second particles is about 8 weight (wt %) to about 60 wt %, about 10 wt % to about 50 wt %, about 15 wt % to about 40 wt %, or about 20 wt % to about 30 wt %, with respect to a total weight of the mixture. By having the amount in such a range, the second particles may further improve, for example, cycle characteristics of the all-solid secondary battery.

For example, the binder included in the negative electrode active material layer 22 may include, but not limited to, styrene butadiene rubber (SBR), polytetrafluoroethylene, polyvinylidene fluoride, polyethylene, polyvinylidene fluoride/hexafluoropropylene copolymer, polyacrylonitrile, or polymethylmethacrylate, and any suitable material that is used as a binder in the art may be used. The binder may consist of a single binder or a plurality of different binders.

By including the binder, the negative electrode active material layer 22 may be stabilized on the negative electrode current collector 21. In addition, despite a volume change and/or a relative position change of the negative electrode active material layer 22 during charging and discharging, cracks of the negative electrode active material layer 22 are suppressed. For example, when the negative electrode active material layer 22 does not include the binder, the negative electrode active material layer 22 may be easily separated from the negative electrode current collector 21. If the negative electrode active material layer 22 is separated from the negative electrode current collector 21, a portion of negative electrode current collector 21 can contact the solid electrolyte layer 30 by exposing the negative electrode current collector 21, and thus a possibility of generating a short circuit may increase. The negative electrode active material layer 22 may be prepared by, for example, coating and drying on the negative electrode current collector 21 a slurry in which a material constituting the negative electrode active material layer 22 is dispersed. The binder is included in the negative electrode active material layer 22, and the binder may improve a stability of the dispersion of the negative electrode active material in the slurry. For example, when the slurry is coated on the negative electrode current collector 21 by screen printing, it is possible to suppress clogging of a screen (for example, clogging of aggregates of the negative electrode active material).

The negative electrode active material layer 22 may further include, for example, an additive, such as a filler, a coating agent, a dispersing agent, or an ion-conductive agent.

The negative electrode active material layer 22 may have a thickness of, for example, 50% or less, 40% or less, 30% or less, 20% or less, 10% or less, or 5% or less of the thickness of the positive electrode active material layer 12. The thickness of the negative electrode active material layer 22 may be, for example, about 1 μm to about 20 μm, about 2 μm to about 10 μm, or about 3 μm to about 7 μm. If the negative electrode active material layer 22 is too small, it may be difficult to improve cycle characteristics of the all-solid secondary battery 1, because a lithium dendrite formed between the negative electrode active material layer 22 and the negative electrode current collector 21, may break down the negative electrode active material layer 22. If the thickness of the negative electrode active material layer 22 is excessively increased, the energy density of the all-solid secondary battery 1 may be lowered, and internal resistance of the all-solid secondary battery 1 may be increased by the negative electrode active material layer 22, and thus may be difficult to improve the cycle characteristics of the all-solid secondary battery 1.

If the thickness of the negative electrode active material layer 22 is reduced, for example, a charging capacity of the negative electrode active material layer 22 is also decreased. The charging capacity of the negative electrode active material layer 22 may be, for example, about 50% or less, about 40% or less, about 30% or less, about 20% or less, about 10% or less, about 5% or less, or about 2% or less, as compared with the charging capacity of the positive electrode active material layer 12. The charging capacity of the negative electrode active material layer 22 is, for example, about 0.1% to about 50%, about 0.1% to about 40%, about 0.1% to about 30%, about 0.1% to about 20%, about 0.1% to about 10%, about 0.1% to about 5%, or about 0.1% to about 2%, as compared with the charging capacity of the positive electrode active material layer 12. If the charging capacity of the negative electrode active material layer 22 is too small, the thickness of the negative electrode active material layer 22 is very small, and thus a lithium dendrite formed between the negative electrode active material layer 22 and the negative electrode current collector 21 during repeated charging and discharging cycles may disrupt the negative electrode active material layer 22, and as a result, it is difficult to improve the cycle characteristics of the all-solid secondary battery 1. If the charging capacity of the negative electrode active material layer 22 is excessively increased, the energy density of the all-solid secondary battery 1 is lowered and the internal resistance of the all-solid secondary battery 1 is increased by the negative electrode active material layer 22, and thus it is difficult to improve the cycle characteristics of the all-solid secondary battery 1.

The charging capacity of the positive electrode active material layer 12 is obtained by multiplying the mass of a positive electrode active material of the positive electrode active material layer 12 by a specific charging capacity (mAh/g) of the positive electrode active material. When various kinds of cathode active materials are used, the charging capacity density multiplied by the mass is calculated for each positive electrode active material, and the sum of these values is the charging capacity of the positive electrode active material layer 12. The charging capacity of the negative electrode active material layer 22 is also calculated in the same manner. That is, the charging capacity of the negative electrode active material layer 22 is obtained by multiplying the mass of the negative electrode active material of the negative electrode active material layer 22 by the specific charging capacity (mAh/g) of the negative electrode active material. When various kinds of negative electrode active materials are used, charging capacity density multiplied by the mass are calculated for each negative electrode active material, and the sum of these values is the charging capacity of the negative electrode active material layer 22. Here, the specific charging capacity of the positive electrode active material and the negative electrode active material is a capacity estimated by using an all-solid half-cell using a lithium metal as a counter electrode. The charging capacities of the positive electrode active material layer 12 and the negative electrode active material layer 22 are directly measured by measuring the charging capacity using the all-solid half-cell. The measured charging capacity is divided into the mass of each active material to obtain the specific charging capacity. Alternatively, the charging capacities of the positive electrode active material layer 12 and the negative electrode active material layer 22 may be initial charging capacities measured during first-cycle charging.

Referring to FIG. 10, the all-solid secondary battery 1*a* may further include, for example, a metal layer 23 disposed between the negative electrode current collector 21 and the negative electrode active material layer 22. The metal layer 23 includes lithium or a lithium alloy. Thus, the metal layer 23 may serve as, for example, a lithium reservoir. The lithium alloy may include, for example, a Li—Al alloy, Li—Sn alloy, Li—In alloy, Li—Ag alloy, Li—Au alloy, Li—Zn alloy, Li—Ge alloy, or a Li—Si alloy, but is not limited thereto and any suitable alloy used as the lithium alloy in the art may be used. The metal layer 23 may consist of one of these alloys or lithium, or may consist of a combination of alloys.

A thickness of the metal layer 23 is not limited, but is, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness of the metal layer 23 is too small, it is difficult to serve as a lithium reservoir by the metal layer 23. When the thickness of the metal layer 23 is too large, the mass and the volume of the all-solid secondary battery 1 are increased and there is a possibility that the cycle characteristics of the all-solid secondary battery 1 may be still deteriorated. The metal layer 23 may be, for example, a metal foil having the thickness in such a range.

In the all-solid secondary battery 1*a*, for example, the metal layer 23 may be placed between the negative electrode current collector 21 and the negative electrode active material layer 22 before assembling the all-solid secondary battery 1 or precipitated between the negative electrode current collector 21 and the negative electrode active material layer 22 by charging after assembling the all-solid secondary battery 1. When the metal layer 23 is placed between the negative electrode current collector 21 and the negative electrode active material layer 22 before assembling the all-solid secondary battery 1*a*, the metal layer 23 is a layer including lithium and thus serves as a lithium reservoir. For example, lithium foil may be placed between the negative electrode current collector 21 and the negative electrode active material layer 22 before assembling the all-solid secondary battery 1*a*. By doing so, the cycle characteristics of the all-solid secondary battery 1*a* including the metal layer 23 may be further improved. When the metal layer 23 is precipitated by charging after assembling the all-solid secondary battery 1*a*, the metal layer 23 is not included when assembling the all-solid secondary battery 1*a*, and thus the energy density of the all-solid secondary battery 1*a* is increased. For example, when the all-solid secondary battery 1 is charged, the charging capacity of the negative electrode active material layer 22 is exceeded. That is, the negative electrode active material layer 22 is overcharged. At an initial stage of charging, lithium is absorbed in the negative electrode active material layer 22. The negative electrode active material included in the negative electrode active material layer 22 forms an alloy or a compound with lithium ions which have moved from the positive electrode layer 10. When the negative electrode active material layer 22 is charged in excess of the capacity thereof, for example, lithium may be precipitated on a rear surface of the negative electrode active material layer 22, that is, between the negative electrode current collector 21 and the negative electrode active material layer 22, and a metal layer corresponding to the metal layer 23 is formed by the precipitated lithium. The metal layer 23 is a metal layer mainly including lithium (that is, lithium metal). This result is obtained because the negative electrode active material included in the negative electrode active material layer 22 is formed of a material forming an alloy or a compound with lithium. During discharging, lithium in the negative electrode active material layer 22 and the lithium from the metal layer 23, that is, the metal layer mainly including lithium, is ionized to move toward the positive electrode layer 10. Therefore, in the all-solid secondary battery 1*a*, lithium may be used as a negative electrode active material. In addition, since the metal layer 23 is coated by the negative electrode active material layer 22, the negative electrode active material layer 22 may serve as a protection layer of the metal layer 23 and may suppress precipitation and growth of lithium dendrites. Accordingly, it is possible to suppress a short circuit and a capacity reduction of the all-solid secondary battery 1*a*, thereby improving the cycle characteristics of the all-solid secondary battery 1*a*. In addition, when the metal layer 23 is placed by charging after assembling the all-solid secondary battery 1*a*, the negative electrode current collector 21, the negative electrode active material layer 22, and an area therebetween are, for example, Li-free areas not including lithium (Li) in an initial state or a state after discharging of the all-solid secondary battery 1*a*.

The negative electrode current collector 21 includes, for example, a material not reacting with lithium, that is, a material not forming an alloy nor a compound with lithium. Examples of the material constituting the negative current collector 21 may include, but not limited to, copper (Cu), stainless steel, titanium (Ti), iron (Fe), cobalt (Co), and nickel (Ni), and any suitable material that is used as an electrode current collector in the art may be used. The negative electrode current collector 21 may include one of the above-described metals or an alloy or coating material of two or more metals. The negative electrode current collector 21 may be in the form of a plate or a foil.

The all-solid secondary battery 1 may further include, for example, a thin film including elements capable of forming an alloy with lithium on the negative electrode current collector 21. The thin film is placed between the negative electrode current collector 21 and the negative electrode active material layer 22. The thin film may include, for example, an element capable of forming an alloy with lithium. Examples of the element that is alloyable with lithium include, but not limited to, gold, silver, zinc, tin, indium, silicon, aluminum, or bismuth, and any suitable element that is capable of forming an alloy with lithium may be used. The thin film may include one of these metals or include an alloy of various kinds of metals. Since the thin film is placed on the negative electrode current collector 21, a precipitated form of the metal layer 23 is precipitated, for example, between the thin film and the negative electrode active material layer 22 is further planarized and the cycle characteristics of the all-solid secondary battery 1 may be further improved.

A thickness of the thin film may be, for example, about 1 nm to about 800 nm, about 10 nm to about 700 nm, about 50 nm to about 600 nm, or about 100 nm to about 500 nm. When the thickness of the thin film thin film is less than 1 nm, it may be difficult to exhibit the function of the thin film. When the thickness of the thin film thin film is too large, the thin film itself absorbs lithium, and as a result, the precipitation amount of lithium is decreased in a negative electrode, the energy density of the all-solid secondary battery 1 is deteriorated, and the cycle characteristics of the all-solid secondary battery 1 may be deteriorated. The thin film may be placed on the negative electrode current collector 21 by, for example, a vacuum deposition method, a sputtering method, or a plating method, but the method is not limited thereto and any suitable method capable of forming a thin film in the art may be used.

Also disclosed is a protected positive electrode comprising: a current collector; a positive electrode layer including a positive electrode active material; and a protection layer comprising solid ion conductor on the positive electrode layer. The positive electrode layer and the positive electrode active material are as disclosed. The protected positive electrode may be formed by coating a layer of the solid ion conductor on the positive electrode active material layer.

Also disclosed is a protected negative electrode comprising: a current collector; a negative electrode layer including a negative electrode active material; and a protection layer comprising solid ion conductor on the negative electrode layer. The negative electrode layer and the negative electrode active material are as disclosed. The protected negative electrode may be formed by coating a layer of the solid ion conductor on the negative electrode active material layer.

A method of preparing a solid ion conductor compound according to one or more aspects of embodiments include: preparing a mixture by mixing a lithium precursor compound and a lanthanide-element-containing precursor compound (to be referred to as a "lanthanide precursor compound" hereinafter) to prepare a mixture; and treating, e.g., reacting, the mixture, e.g., in a solid phase, to prepare the solid ion conductor.

The lithium precursor compound may include a lithium halide. Examples of the lithium halide may include LiCl, LiBr, or a combination thereof.

The lithium precursor compound may include a halides of a lanthanide element. Examples of the halides of lanthanide elements may include $LaCl_3$, $CeCl_3$, $PrCl_3$, $NdCl_3$, $PmCl_3$, $SmCl_3$, $EuCl_3$, $GdCl_3$, $TbCl_3$, $DyCl_3$, $HoCl_3$, $ErCl_3$, $TmCl_3$, $YbCl_3$, $LuCl_3$, $CeBr_3$, $LaBr_3$, $PrBr_3$, $NdBr_3$, $PmBr_3$, $SmBr_3$, $EuBr_3$, $GdBr_3$, $TbBr_3$, $DyBr_3$, $HoBr_3$, $ErBr_3$, $TmBr_3$, $YbBr_3$, $LuBr_3$, or a combination thereof. Examples of the lanthanide precursor compound may include $LaCl_3$, $HoCl_3$, $TmCl_3$, $YbCl_3$, $LuCl_3$, $HoBr_3$, $TmBr_3$, $YbBr_3$, $LuBr_3$, or a combination thereof.

According to an embodiment, the mixture may include one kind of a lithium precursor compound and one kind of lanthanum precursor compound, or two different kinds of lithium precursor compounds and one kind of lanthanum precursor compound.

A mixing ratio of the lithium precursor compounds and the lanthanide precursor compounds included in the mixture may be appropriately adjusted in consideration of the composition ratio of a desired solid ion conductor.

According to an embodiment, the reacting of the mixture in a solid phase may include ball-mill mixing the mixture in a dry and inert atmosphere at 700 rpm for 72 hours.

According to an embodiment, the ball-mill mixing may be performed with intervals of a first time period, with a resting period of a second time period between the intervals of the first time period. Here, the first time period and the second time period may be the same as or different from each other. For example, the first time period may be twice as long as the second time period. As such, by having a resting period during ball-mill mixing, the solid ion conductor compound may be obtained in the form of a mixture of crystalline and amorphous phases.

According to an embodiment, the method for preparing the solid ion conductor compound is performed at room temperature and does not comprise a calcinating step for crystallization. For example, the method for preparing the solid ion conductor compound may be performed at room temperature (25° C.).

According to an embodiment, after the reacting of the mixture in a solid phase, the method may further comprise performing heat treatment for 4-6 hours at about 200° C. to about 300° C., after the reacting of the mixture in a solid phase.

The heat treatment may be optionally performed for improving ionic conductivity, and, for example, in Formula 1, when the heat treatment is performed on a solid ion conductor compound satisfying the condition $0<y/z\leq1$, the ionic conductivity of the solid ion conductor compound may be improved.

In addition, when heat treatment is performed on the solid ion conductor satisfying $1<y/z<6$ in Formula 1, a Br mole fraction is low, crystallization occurs, thereby lowering the ionic conductivity.

Figure 5:
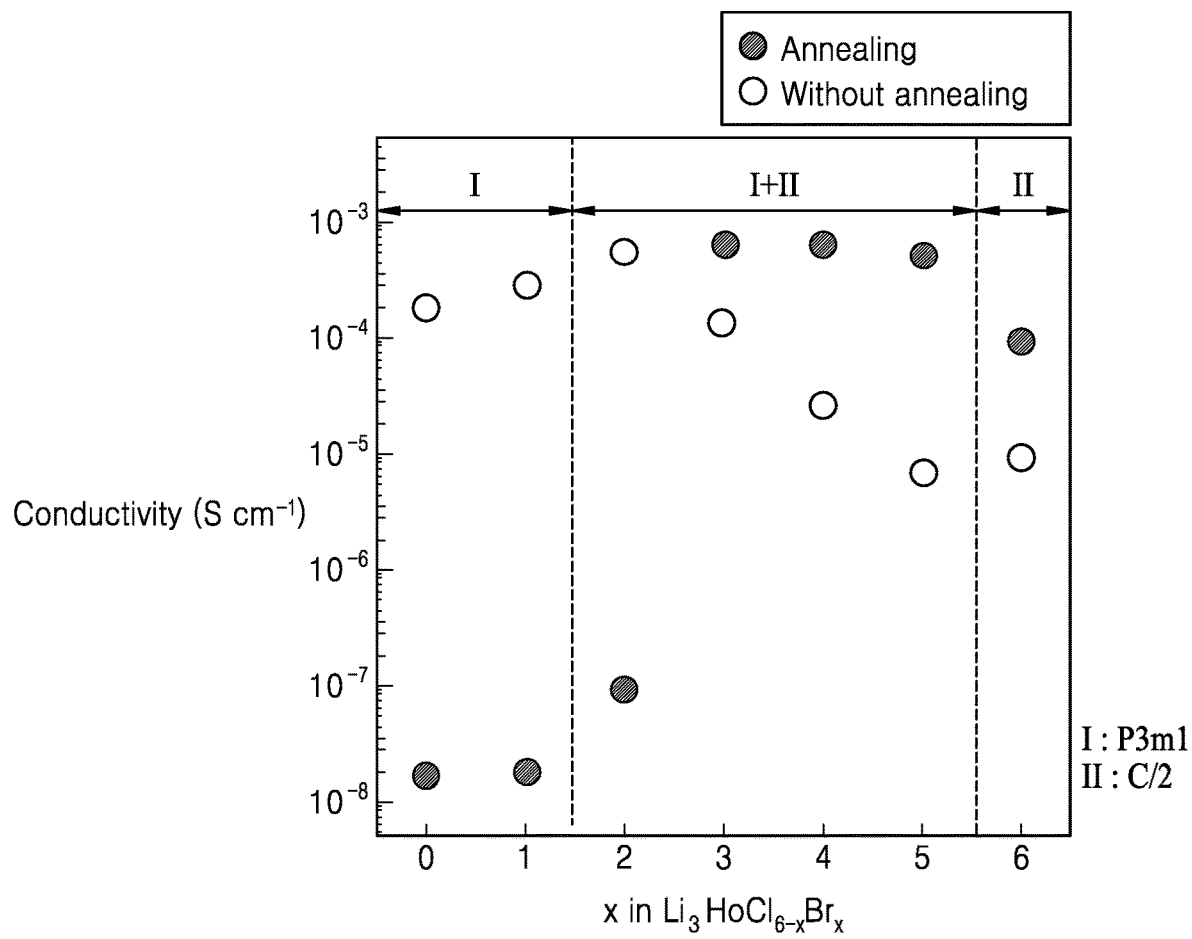
FIG. 5 is a graph of conductivity (siemens per centimeter, $Scm^{-1}$) versus x in $Li_3HoCl_{6-x}Br_x$ showing a change in the mole fraction of Br and ionic conductivities and crystal phases before and after heat treatment.

To verify this, in the case where the Br mole fraction is 0 to 6, crystalline phases and ionic conductivities before and after the heat treatment are measured and the results thereof are shown in FIG. 5.

The inert atmosphere is an inert gas-containing atmosphere. For example, the inert gas may include, but not limited to, nitrogen or argon, and any suitable inert gas that is used in the art as an inert gas may be suitably used.

The inventive concept of the present disclosure will be described in more detail through the following Examples and Comparative Examples. However, the embodiment is intended to illustrate the disclosed aspects, and the scope of the inventive concept is shall not be limited by these Examples.

EXAMPLES

Preparation of the Solid Ion Conductor

Example 1

In a glove box under an argon (Ar) atmosphere, $HoCl_3$ as a lanthanum precursor compound and LiBr as a lithium precursor compound were added into a planetary ball mill in a stoichiometric ratio of 1:3, zirconia (YSZ) balls were added thereto, and a cycle of milling and mixing at a speed of 700 rpm for 10 minutes, and then providing a resting period of 5 minutes was repeatedly performed for 72 hours, thereby obtaining a resultant. The resultant was milled and then crystallized by performing heat treatment at 260° C. for 5 hours, thereby obtaining a solid ion conductor compound having a composition listed in Table 1. Next, for X-ray diffraction (XRD) analysis, the obtained solid ion conductor compound was pressed with a uniaxial pressure of 350 megapascals (MPa) to prepare a pellet having a thickness of about 800 μm and a diameter of about 13 mm.

Example 2

A solid ion conductor compound was obtained in the same manner as in Example 1, except that $HoBr_3$ as a lanthanum precursor compound and LiCl and LiBr as lithium precursor compounds were mixed in a stoichiometric ratio of 1:2:1, and then molded to prepare a pellet.

Example 3

A solid ion conductor compound was obtained in the same manner as in Example 1, except that $HoBr_3$ as a lanthanum precursor compound and LiCl and LiBr as lithium precursor compounds were mixed in a stoichiometric ratio of 1:1:2, and then molded to prepare a pellet.

Example 4

In a dry room having a dew point of −60°, $HoCl_3$ as a lanthanum precursor compound and LiCl and LiBr as lithium precursor compounds were into a planetary ball mill in a stoichiometric ratio of 1:1:2, zirconia (YSZ) balls were added thereto, and a cycle of milling and mixing at a speed of 700 rpm for 10 minutes, and then providing a resting period of 5 minutes was repeatedly performed for 72 hours, thereby obtaining a solid ion conductor compound having a composition listed in Table 1. Next, for XRD analysis, the obtained solid ion conductor compound was pressed with a uniaxial pressure of 350 MPa to prepare a pellet having a thickness of about 800 μm and a diameter of about 13 mm.

Example 5

A solid ion conductor compound was obtained in the same manner as in Example 4, except that $HoCl_3$ as a lanthanum precursor compound and LiCl and LiBr as lithium precursor compounds were mixed in a stoichiometric ratio of 1:2:1, and then molded to prepare a pellet.

Example 6

A solid ion conductor compound was obtained in the same manner as in Example 1, except that $LuBr_3$ as a lanthanum precursor compound and LiCl and LiBr as lithium precursor compounds were mixed in a stoichiometric ratio of 1:2:1, and then molded to prepare a pellet.

Example 7

A solid ion conductor compound was obtained in the same manner as in Example 4, except that $LuCl_3$ as a lanthanum precursor compound and LiCl and LiBr as lithium precursor compounds were mixed in a stoichiometric ratio of 1:2:1, and then molded to prepare a pellet.

Example 8

A solid ion conductor compound was obtained in the same manner as in Example 1, except that $TmCl_3$ as a lanthanum precursor compound and LiBr as a lithium precursor compound were mixed in a stoichiometric ratio of 1:3, and then molded to prepare a pellet.

Example 9

A solid ion conductor compound was obtained in the same manner as in Example 1, except that $TmBr_3$ as a lanthanum precursor compound and LiCl and LiBr as lithium precursor compounds were mixed in a stoichiometric ratio of 1:2:1, and then molded to prepare a pellet.

Example 10

A solid ion conductor compound was obtained in the same manner as in Example 1, except that $YbCl_3$ as a lanthanum precursor compound and LiBr as a lithium precursor compound were mixed in a stoichiometric ratio of 1:3, and then molded to prepare a pellet.

Example 11

A solid ion conductor compound was obtained in the same manner as in Example 1, except that $HoBr_3$ as a lanthanum precursor compound and LiCl as a lithium precursor compound were mixed in a stoichiometric ratio of 1:2.75, and then molded to prepare a pellet.

Example 12

In a dry room having a dew point of −60°, $HoBr_3$ as a lanthanum precursor compound and LiCl as lithium precursor compound and NaCl as a M1 precursor compound were into a planetary ball mill in a stoichiometric ratio of 1:2.95:0.05, zirconia (YSZ) balls were added thereto, and a cycle of milling and mixing at a speed of 700 rpm for 10 minutes, and then providing a resting period of 5 minutes was repeatedly performed for 72 hours, thereby obtaining a resultant. The resultant was milled and then crystallized by performing heat treatment at 260° C. for 5 hours, thereby obtaining a solid ion conductor compound having a composition listed in Table 1. Next, for XRD analysis, the obtained solid ion conductor compound was pressed with a uniaxial pressure of 350 MPa to prepare a pellet having a thickness of about 800 μm and a diameter of about 13 mm.

Example 13

A solid ion conductor compound was obtained in the same manner as in Example 1, except that $LuCl_3$ as a lanthanum precursor compound and LiBr as a lithium precursor compound were mixed in a stoichiometric ratio of 1:3, and then molded to prepare a pellet.

Comparative Example 1

In a glove box under an argon (Ar) atmosphere, $HoCl_3$ as a lanthanum precursor compound and LiCl as a lithium precursor compound were into a planetary ball mill in a stoichiometric ratio of 1:3, zirconia (YSZ) balls were added thereto, and a cycle of milling and mixing at a speed of 700 rpm for 10 minutes, and then providing a resting period of 5 minutes was repeatedly performed for 24 hours, thereby obtaining a resultant. The resultant was placed in a furnace and then subjected to calcination at a temperature of 260° C. for 5 hours, thereby obtaining a crystalized solid ion conductor compound having a composition listed in Table 1. Next, for XRD analysis, the obtained solid ion conductor compound was pressed with a uniaxial pressure of 200 MPa to prepare a pellet having a thickness of about 10 mm and a diameter of about 13 mm.

Comparative Example 2

A solid ion conductor compound was obtained in the same manner as in Comparative Example 1, except that $HoBr_3$ as a lanthanum precursor compound and LiBr as a lithium precursor compound were mixed in a stoichiometric ratio of 1:3, and then molded to prepare a pellet.

Comparative Example 3

A solid ion conductor compound was obtained in the same manner as in Comparative Example 1, except that $LuCl_3$ as a lanthanum precursor compound and LiCl as a lithium precursor compound were mixed in a stoichiometric ratio of 1:3, and then molded to prepare a pellet.

Comparative Example 4

A solid ion conductor compound was obtained in the same manner as in Comparative Example 1, except that LuBr$_3$ as a lanthanum precursor compound and LiBr as a lithium precursor compound were mixed in a stoichiometric ratio of 1:3, and then molded to prepare a pellet.

Comparative Example 5

A solid ion conductor compound was obtained in the same manner as in Comparative Example 1, except that TmCl$_3$ as a lanthanum precursor compound and LiCl as a lithium precursor compound were mixed in a stoichiometric ratio of 1:3, and then molded to prepare a pellet.

Comparative Example 6

A solid ion conductor compound was obtained in the same manner as in Comparative Example 1, except that TmBr$_3$ as a lanthanum precursor compound and LiBr as a lithium precursor compound were mixed in a stoichiometric ratio of 1:3, and then molded to prepare a pellet.

Comparative Example 7

A solid ion conductor compound was obtained in the same manner as in Comparative Example 1, except that YbCl$_3$ as a lanthanum precursor compound and LiCl as a lithium precursor compound were mixed in a stoichiometric ratio of 1:3, and then molded to prepare a pellet.

Comparative Example 8

A solid ion conductor compound was obtained in the same manner as in Comparative Example 1, except that YbBr$_3$ as a lanthanum precursor compound and LiBr as a lithium precursor compound were mixed in a stoichiometric ratio of 1:3, and then molded to prepare a pellet.

Comparative Example 9

A solid ion conductor compound was obtained in the same manner as in Comparative Example 1, except that TbCl$_3$ as a lanthanum precursor compound and LiCl as a lithium precursor compound were mixed in a stoichiometric ratio of 1:3, and then molded to prepare a pellet.

Comparative Example 10

A solid ion conductor compound was obtained in the same manner as in Comparative Example 1, except that InCl$_3$ as a lanthanum precursor compound and LiCl as a lithium precursor compound were mixed in a stoichiometric ratio of 1:3, and then molded to prepare a pellet.

Comparative Example 11

A solid ion conductor compound was obtained in the same manner as in Comparative Example 1, except that YCl$_3$ as a yttrium precursor compound and LiCl as a lithium precursor compound were mixed in a stoichiometric ratio of 1:3, and then molded to prepare a pellet.

Comparative Example 12

A solid ion conductor compound was obtained in the same manner as in Comparative Example 1, except that InCl$_3$ as an indium precursor compound and LiBr as a lithium precursor compound were mixed in a stoichiometric ratio of 1:3, and then molded to prepare a pellet.

Preparation of All-Solid Secondary Battery

Example 14

Preparation of Positive Electrode Mixture Powder
As a positive electrode active material, LiNi$_{0.8}$Co$_{0.15}$Mn$_{0.05}$O$_2$ (NCM) was used as received. The pellet of the solid ion conductor compound prepared in Example 1 was milled to prepare a powder as a solid electrolyte. As a conductive agent, carbon nanofiber (CNF) was used as received. These materials, that is, the positive electrode active material, the solid electrolyte and the conductive agent, were mixed in a weight ratio of 65:35:5, to prepare positive electrode mixture powder.
Preparation of Solid Electrolyte Powder
The pellet prepared in Example 1 was milled using an agate mortar to prepare a solid electrolyte powder.
Preparation of Negative Electrode Layer
A 30 μm thick lithium metal foil was prepared as a negative electrode.
Preparation of All-Solid Secondary Battery
A negative electrode layer, solid electrolyte powder, and positive electrode mixture powder were stacked on a SUS lower electrode, and then the solid electrolyte powder and the positive electrode mixture powder were pressed with a uniaxial pressure of 350 MPa to prepare a pellet, thereby preparing an all-solid secondary battery using the pellet having a diameter of about 13 mm.

Comparative Example 13

An all-solid secondary battery was prepared in the same manner as in Example 14, except that the solid ion conductor compound obtained in Comparative Example 10 was used as a solid electrolyte.

Fabrication of Lithium Symmetric Cell

Example 15

A symmetrical lithium cell was fabricated by attaching a Cu foil coated with 20 μm Li to both surfaces of the pellet prepared in Example 13 and pressing with a pressure of 250 MPa by cold isostatic pressing (CIP).

Comparative Example 14

A symmetrical cell was fabricated in the same manner as in Example 15, except that the pellet prepared in Comparative Example 12 was used, instead of the pellet prepared in Example 13.

Evaluation Example 1: Experiment by X-Ray Diffraction

The solid ion conductor compounds Examples 1-5 and Comparative Examples 1 and 2 were milled using an agate mortar to prepare powders, XRD spectrums thereof were measured, and the measurement results were shown in Table 1 and FIG. 1.

When the Br mole fraction (z value) is 2, diffraction peaks were observed at a diffraction angle of 40°2θ to 44°2θ, and when the Br mole fraction is 3 or greater, diffraction peaks were not observed at the same diffraction angle of 40°2θ to 44°2θ. This suggests that, when the mole fraction of Br is 3 or greater, that is, when the mole fraction of Br is equal to or greater than that of Cl, the solid ion conductor compound includes an amorphous phase.

Evaluation Example 2: Measurement of Ionic Conductivity

Each of the solid ion conductor compounds Examples 1-13 and Comparative Examples 1-12 where milled using an agate mortar to prepare a powder, and 300 milligrams (mg) of the prepared powder was pressed with a pressure of 4 tons/cm² to prepare a pellet specimen having a thickness of about 700 μm and a diameter of about 13 mm. Gold (Au) electrodes having a thickness of 10 nm and a diameter of 13 mm were placed on both surfaces of the prepared specimen, thereby preparing a symmetrical cell. The symmetrical cell was prepared in a glove box under an argon (Ar) atmosphere.

Impedance of each pellet specimen having Au electrodes placed on both surfaces thereof was measured by a 2-probe method using Material Mates 7260 impedance analyzer. The frequency range was from about 1 Hertz (Hz) to about 1 megaHertz (MHz), and the amplitude voltage was 10 mV. The measurements were conducted in an atmosphere of Ar at 20° C. A resistance was obtained from an arc of a Nyquist plot with respect to the impedance measurement result, and ionic conductivity of each pellet specimen was calculated in consideration of the area and thickness of the specimen. The measurement results are illustrated in Table 1, and temperature-dependent ion conductivities of the solid ion conductor compounds prepared in Example 1 and Comparative Examples 1 and 2 were measured, the results of which are shown in FIG. 2.

Referring to FIG. 2, it was confirmed that the ionic conductivity of $10^{-4}$ Siemens per centimeter (Scm$^{-1}$) was maintained over a temperature range from a low temperature (−20° C.) to a high temperature (40° C.).

TABLE 1

| | Composition | Ionic conductivity (mScm$^{-1}$) |
|---|---|---|
| Example 1 | Li$_3$HoCl$_3$Br$_3$ | 5.9 · 10$^{-04}$ |
| Example 2 | Li$_3$HoCl$_2$Br$_4$ | 5.9 · 10$^{-04}$ |
| Example 3 | Li$_3$HoCl$_1$Br$_5$ | 4.8 · 10$^{-04}$ |
| Example 4 | Li$_3$HoCl$_4$Br$_2$ | 5.1 · 10$^{-04}$ |
| Example 5 | Li$_3$HoCl$_5$Br$_1$ | 4.8 · 10$^{-04}$ |
| Example 6 | Li$_3$LuCl$_2$Br$_4$ | 5.0 · 10$^{-04}$ |
| Example 7 | Li$_3$LuCl$_5$Br$_1$ | 2.1 · 10$^{-04}$ |
| Example 8 | Li$_3$TmCl$_3$Br$_3$ | 3.2 · 10$^{-04}$ |
| Example 9 | Li$_3$TmCl$_2$Br$_4$ | 4.0 · 10$^{-04}$ |
| Example 10 | Li$_3$YbCl$_3$Br$_3$ | 2.0 · 10$^{-04}$ |
| Example 11 | Li$_{2.75}$HoCl$_{2.75}$Br$_3$ | 5.3 · 10$^{-04}$ |
| Example 12 | Li$_{2.95}$Na$_{0.05}$HoCl$_3$Br$_3$ | 1.3 · 10$^{-03}$ |
| Example 13 | Li$_3$LuCl$_3$Br$_3$ | 2.8 · 10$^{-04}$ |
| Comparative Example 1 | Li$_3$HoCl$_6$ | 1.7 · 10$^{-04}$ |
| Comparative Example 2 | Li$_3$HoBr$_6$ | 8.7 · 10$^{-05}$ |
| Comparative Example 3 | Li$_3$LuCl$_6$ | 5.2 · 10$^{-05}$ |
| Comparative Example 4 | Li$_3$LuBr$_6$ | 3.2 · 10$^{-05}$ |
| Comparative Example 5 | Li$_3$TmCl$_6$ | 8.3 · 10$^{-05}$ |
| Comparative Example 6 | Li$_3$TmBr$_6$ | 7.2 · 10$^{-05}$ |
| Comparative Example 7 | Li$_3$YbCl$_6$ | 4.6 · 10$^{-05}$ |
| Comparative Example 8 | Li$_3$YbBr$_6$ | 5.0 · 10$^{-05}$ |
| Comparative Example 9 | Li$_3$TbCl$_6$ | 6.9 · 10$^{-07}$ |
| Comparative Example 10 | Li$_3$InCl$_6$ | 5.8 · 10$^{-05}$ |
| Comparative Example 11 | Li$_3$YCl$_6$ | 1.2 · 10$^{-04}$ |
| Comparative Example 12 | Li$_3$InCl$_3$Br$_3$ | 1.4 · 10$^{-04}$ |

Evaluation Example 3: Voltammetry Analysis

Figure 3:
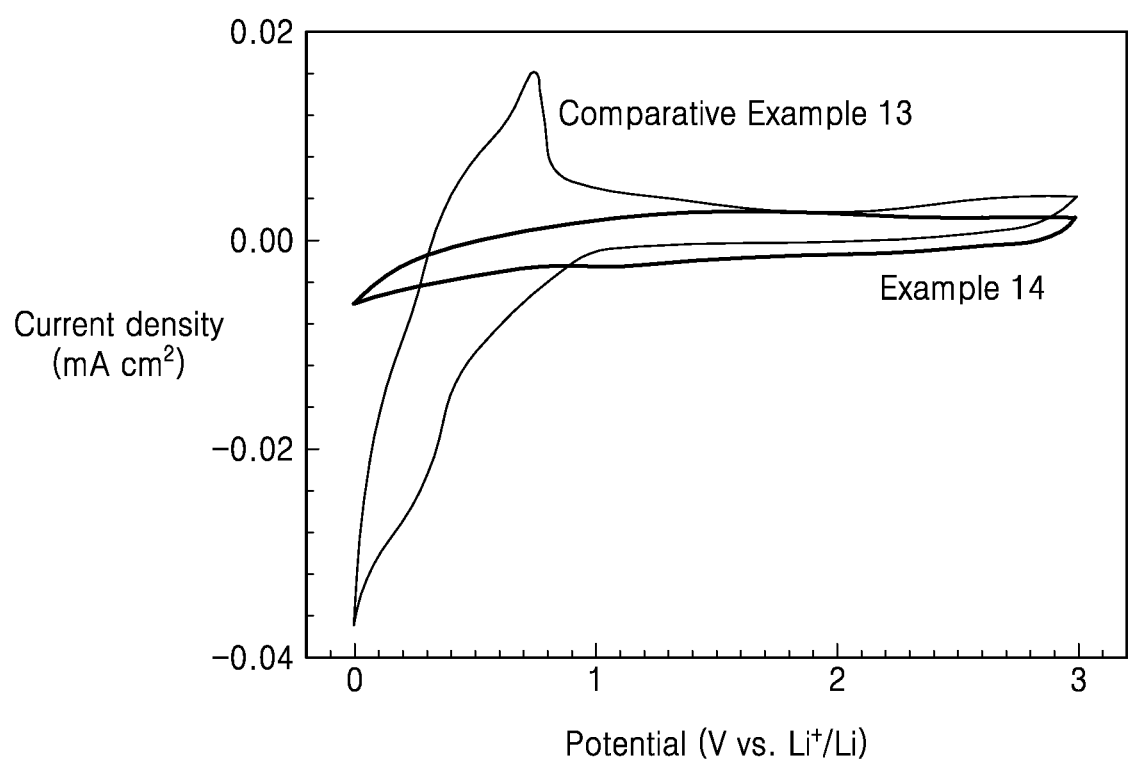
FIG. 3 is a graph of current density (milliamperes per square centimeter) versus potential (V vs. $Li^+$/Li) and shows the results of voltammetry analysis of Example 14 and Comparative Example 13.

Voltammetry analysis of the cells fabricated in Example 14 and Comparative Example 13 was conducted between 0 V and 3V vs. Li$^+$/Li. As shown in FIG. 3, the solid ion conductor prepared in Example 14 was not oxidized or reduced between 0 V and 3 V vs Li$^+$/Li.

Evaluation Example 4: Evaluation of Limiting Current Density

Each of the solid ion conductor compounds prepared in Example 1 and Comparative Example 1 was milled using an agate mortar to prepare powder, and 300 mg of the prepared powder was pressed with a pressure of 4 tons/cm² for 2 minutes to prepare a pellet specimen having a thickness of about 700 μm and a diameter of about 13 mm. A lithium foil having a thickness of 20 μm and a diameter of 8 mm was placed on both surfaces of the prepared specimen and then pressed with 250 Mpa by cold isotactic pressing, thereby preparing a symmetric cell. The symmetric cell was prepared in a glove box under an argon (Ar) atmosphere.

Figure 4:
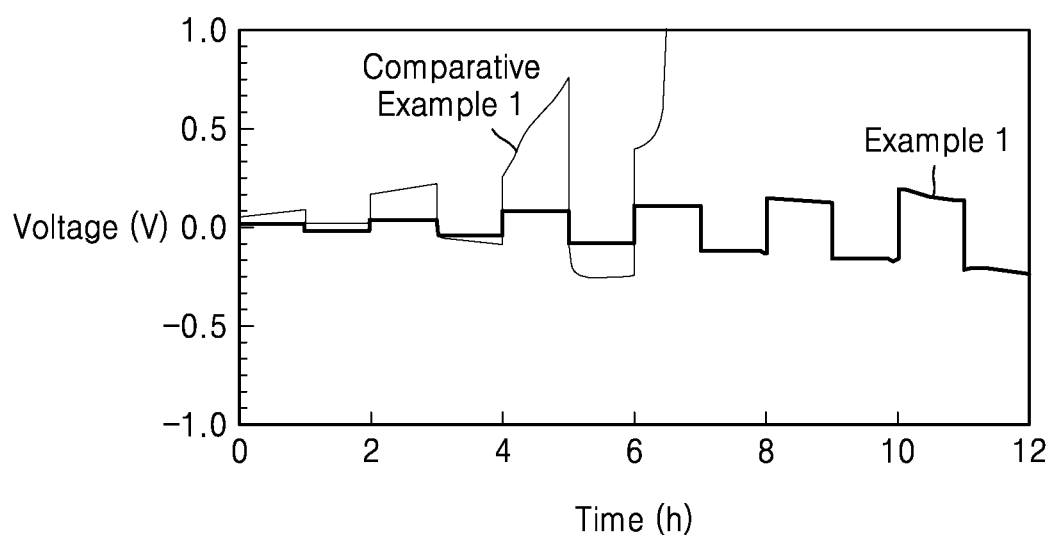
FIG. 4 is a graph of voltage (volts, V) versus time (hours, h) showing limiting current densities of solid ion conductor compounds prepared in Example 1 and Comparative Example 1.

Charging and discharging tests were conducted on specimens each having lithium foil electrodes placed on both surfaces thereof at current densities of 0.05, 0.1, 0.2, 0.3, 0.4, and 0.5 mAcm$^{-2}$, and curves of voltages at the respective current densities over time are shown in FIG. 4.

As confirmed from FIG. 4, the symmetric cell including the solid ion conductor compound prepared in Comparative Example 1 had a short circuit at a current density of 0.3 mAcm$^{-2}$, while the symmetric cell including the solid ion conductor compound prepared in Example 1 was smoothly charged and discharged at a current density of 0.5 mA$^{-2}$.

Evaluation Example 5: DSC Analysis 10 mg of each of the solid ion conductor compounds prepared in Example 1 and Comparative Examples 1 and 2 was sampled, crystallization temperatures and melting temperatures thereof were analyzed by differential scanning calorimetry (DSC), and the analysis results are shown in FIG. 6.

Figure 6:
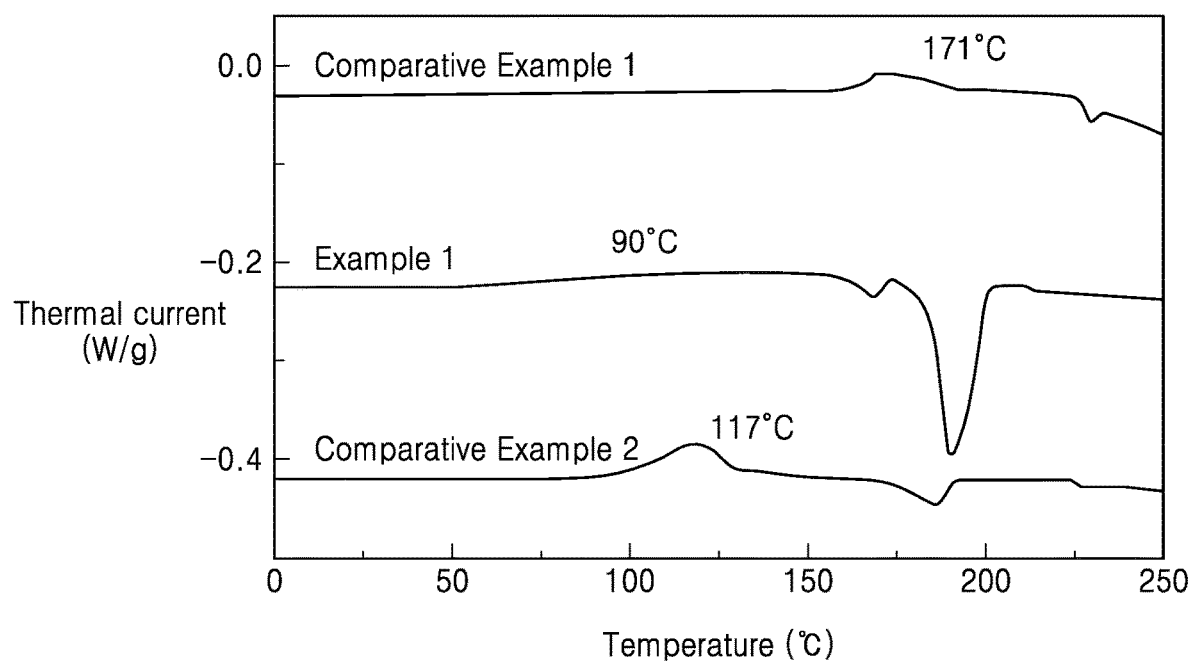
FIG. 6 is a graph of thermal current (watts per gram, W/g) versus temperature (° C.) showing the results of differential scanning calorimetry analysis of solid ion conductor compounds prepared in Example 1, Comparative Examples 1 and 2.

Referring to FIG. 6, the crystallization temperatures of the solid ion conductor compound (Li$_3$HoCl$_3$Br$_3$) of Example 1 were 90° C. and 135° C., and the melting temperature thereof was 168° C., while the crystallization temperature of the solid ion conductor compound ($Li_3HoCl_6$) of Comparative Example 1 was 171° C. and the melting temperature thereof was 229° C., and the crystallization temperature of the solid ion conductor compound ($Li_3HoBr_6$) of Comparative Example 2 was 117° C. and the melting temperature thereof was 186° C. By including two kinds of halogen elements, the solid ion conductor compound of Example 1 had a lower crystallization temperature, compared to the solid ion conductor compounds of Comparative Examples 1 and 2, including one kind of halogen element. As a result, low-temperature synthesis of a solid ion conductor compound is enabled, thereby improving processing efficiency.

Evaluation Example 6: Evaluation of Cycle Stability

Figure 7:
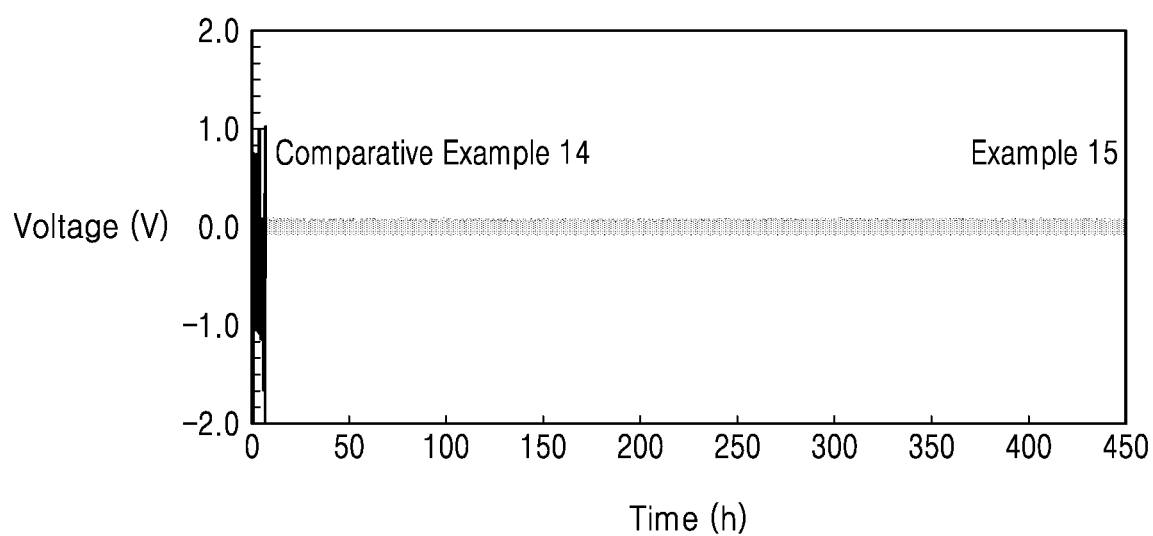
FIG. 7 is a graph of voltage (V) versus time (h) showing voltage changes according to initial charge/discharge cycles of lithium symmetric cells fabricated in Example 15 and Comparative Example 14.

Voltage changes of the lithium symmetric cells fabricated in Example 15 and Comparative Example 14 according to charging and discharging cycles were observed, confirming stability with respect to lithium negative electrodes, and the results are shown in FIG. 7.

Referring to FIG. 7, it was confirmed that the cell of Comparative Example 14 had a short circuit and stopped operating at an initial operating stage, and the cell of Example 15 maintained a stable operation even after 450 or more cycles.

According to an aspect, provided is an electrochemical cell having improved stability and cycle characteristics by including a solid ion conductor compound having improved lithium ionic conductivity and stability with respect to a lithium metal.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid ion conductor compound represented by Formula 1:

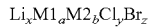

$Li_xM1_aM2_bCl_yBr_z$            Formula 1 wherein M1 comprises Na, K, Rb, Cs, Fr, Be, Mg, Ca, Sr, Ba, Ra, Sc, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, or a combination thereof, M2 comprises La, Ce, Pr, Nd, Pm, Eu, Dy, Ho, Er, Tm, Yb, Lu, or a combination thereof, $0<x<3.5$, $0≤a<1.5$, $0<b<1.5$, $0<y<6$, $0<z<6$, and $0.16<z/(y+z)<0.34$, wherein the solid ion conductor compound has an ionic conductivity of $10^{-4}$ Siemens per centimeter or greater at −20° C. to 40° C., and wherein the solid ion conductor compound does not have a diffraction peak at 40°2θ to 44°2θ, when analyzed by X-ray diffraction using CuKα radiation, wherein the solid ion conductor compound comprises a phase having a crystal structure that belongs to a C2/m space group, and a phase having a crystal structure that belongs to a P3 m1 space group.

2. The solid ion conductor compound of claim 1, wherein M2 comprises La, Ho, Tm, Yb, Lu, or a combination thereof.

3. The solid ion conductor compound of claim 1, wherein in Formula 1, a portion of the Li crystallographic sites are occupied by M1.

4. The solid ion conductor compound of claim 1, wherein M1 comprises Na, K, Rb, Cs, Fr, Be, Mg, Ca, Sr, Ba, Ra, Sc, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, or a combination thereof.

5. The solid ion conductor compound of claim 1, wherein the solid ion conductor compound comprises:

$Li_xHoCl_yBr_z$ wherein $0<x<3.5$, $0<y<6$, $0<z<6$, and $0.16<z/(y+z)<0.34$, $Li_xCeCl_yBr_z$ wherein $0<x<3.5$, $0<y<6$, $0<z<6$, and $0.16<z/(y+z)<0.34$, $Li_xPrCl_yBr_z$ wherein $0<x<3.5$, $0<y<6$, $0<z<6$, and $0.16<z/(y+z)<0.34$, $Li_xNdCl_yBr_z$ wherein $0<x<3.5$, $0<y<6$, $0<z<6$, and $0.16<z/(y+z)<0.34$, $Li_xPmCl_yBr_z$ wherein $0<x<3.5$, $0<y<6$, $0<z<6$, and $0.16<z/(y+z)<0.34$, $Li_xEuCl_yBr_z$ wherein $0<x<3.5$, $0<y<6$, $0<z<6$, and $0.16<z/(y+z)<0.34$, $Li_xDyCl_yBr_z$ wherein $0<x<3.5$, $0<y<6$, $0<z<6$, and $0.16<z/(y+z)<0.34$, $Li_xErCl_yBr_z$ where $0<x<3.5$, $0<y<6$, $0<z<6$, and $0.16<z/(y+z)<0.34$, $Li_xTmCl_yBr_z$ wherein $0<x<3.5$, $0<y<6$, $0<z<6$, and $0.16<z/(y+z)<0.34$, $Li_xYbCl_yBr_z$ wherein $0<x<3.5$, $0<y<6$, $0<z<6$, and $0.16<z/(y+z)<0.34$, $Li_xLuCl_yBr_z$ wherein $0<x<3.5$, $0<y<6$, $0<z<6$, and $0.16<z/(y+z)<0.34$;

$Li_xM1_aHoCl_yBr_z$ wherein $0<x<3.5$, $0≤a<1.5$, $0<y<6$, $0<z<6$, and $0.16<z/(y+z)<0.34$, $Li_xM1_aCeCl_yBr_z$ wherein $0<x<3.5$, $0≤a<1.5$, $0<y<6$, $0<z<6$, and $0.16<z/(y+z)<0.34$, $Li_xM1_aPrCl_yBr_z$ wherein $0<x<3.5$, $0≤a<1.5$, $0<y<6$, $0<z<6$, and $0.16<z/(y+z)<0.34$, $Li_xM1_aNdCl_yBr_z$ wherein $0<x<3.5$, $0≤a<1.5$, $0<y<6$, $0<z<6$, and $0.16<z/(y+z)<0.34$, $Li_xM1_aPmCl_yBr_z$ wherein $0<x<3.5$, $0≤a<1.5$, $0<y<6$, $0<z<6$, and $0.16<z/(y+z)<0.34$, $Li_xM1_aEuCl_yBr_z$ wherein $0<x<3.5$, $0≤a<1.5$, $0<y<6$, $0<z<6$, and $0.16<z/(y+z)<0.34$, $Li_xM1_aDyCl_yBr_z$ wherein $0<x<3.5$, $0≤a<1.5$, $0<y<6$, $0<z<6$, and $0.16<z/(y+z)<0.34$, $Li_xM1_aErCl_yBr_z$ wherein $0<x<3.5$, $0≤a<1.5$, $0<y<6$, $0<z<6$, and $0.16<z/(y+z)<0.34$, —$Li_xM1_aTmCl_yBr_z$ wherein $0<x<3.5$, $0≤a<1.5$, $0<y<6$, $0<z<6$, and $0.16<z/(y+z)<0.34$, $Li_xM1_aYbCl_yBr_z$ wherein $0<x<3.5$, $0≤a<1.5$, $0<y<6$, $0<z<6$, and $0.16<z/(y+z)<0.34$, $Li_xM1_aLuCl_yBr_z$ wherein $0<x<3.5$, $0≤a<1.5$, $0<y<6$, $0<z<6$, and $0.16<z/(y+z)<0.34$, wherein M1 is independently Na, K, Rb, Cs, Fr, Be, Mg, Ca, Sr, Ba, Ra, Sc, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, or a combination thereof; or a combination thereof.

6. The solid ion conductor compound of claim 1, wherein the solid ion conductor compound has an ionic conductivity of $1.8×10^{-4}$ Siemens per centimeter or greater at −20° C. to 40° C.

7. A solid electrolyte comprising a layer comprising the solid ion conductor compound according to claim 1.

8. An electrochemical cell comprising:
- a positive electrode layer including a positive electrode active material layer;
- a negative electrode layer including a negative electrode active material layer; and
- an electrolyte layer located between the positive electrode layer and the negative electrode layer,
    - wherein the positive electrode active material layer, the electrolyte layer, or a combination thereof comprise the solid ion conductor of claim 1.

9. The electrochemical cell of claim 8, wherein the negative electrode layer comprises lithium metal, a lithium metal alloy, or a combination thereof.

10. The electrochemical cell of claim 8, wherein the electrochemical cell is an all-solid secondary battery.

11. A protected positive electrode comprising:
- a current collector;
- a positive electrode layer including a positive electrode active material; and
- a protection layer comprising the solid ion conductor compound of claim 1 on the positive electrode layer.

12. A protected negative electrode comprising:
- a current collector;
- a negative electrode layer including a negative electrode active material; and
- a protection layer comprising the solid ion conductor compound of claim 1 on the negative electrode layer.

13. The solid ion conductor compound of claim 1, wherein M2 is Ho, Tm, Yb, Lu, or a combination thereof.

14. The solid ion conductor compound of claim 1, wherein the indice a is zero or $0<a\leq0.2$.

15. A method of preparing the solid ion conductor of claim 1, the method comprising:
- mixing a lithium precursor and a lanthanide-element-containing precursor to prepare a mixture; and
- treating the mixture to prepare the solid ion conductor.

16. The method of claim 15, wherein the treating comprises ball-mill mixing the mixture in a dry and inert atmosphere.

17. The method of claim 15, further comprising, after the treating, heat-treating for 4 to 6 hours at about 200° C. to about 300° C.

* * * * *